United States Patent
Li et al.

(10) Patent No.: US 8,477,726 B2
(45) Date of Patent: Jul. 2, 2013

(54) METHOD, SYSTEM AND DEVICE FOR MOBILE STATION HANDOVER

(75) Inventors: Ting Li, Shenzhen (CN); Yunbao Zeng, Shenzhen (CN); Liangliang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 12/822,796

(22) Filed: Jun. 24, 2010

(65) Prior Publication Data

US 2010/0278097 A1   Nov. 4, 2010

Related U.S. Application Data

(63) Continuation of application No. PCT/CN2008/073192, filed on Nov. 25, 2008.

(30) Foreign Application Priority Data

Dec. 24, 2007 (CN) .......................... 2007 1 0161050

(51) Int. Cl.
*H04W 4/00* (2009.01)
(52) U.S. Cl.
USPC ............................. 370/331; 455/436; 370/400
(58) Field of Classification Search
None
See application file for complete search history.

(56) References Cited

U.S. PATENT DOCUMENTS

| | | | | |
|---|---|---|---|---|
| 8,059,603 | B2 * | 11/2011 | Jin ................................ | 370/331 |
| 8,121,087 | B2 * | 2/2012 | Ryu et al. ...................... | 370/331 |
| 2005/0250498 | A1 * | 11/2005 | Lim et al. ...................... | 455/436 |
| 2007/0086388 | A1 | 4/2007 | Kang et al. | |
| 2007/0104148 | A1 * | 5/2007 | Kang et al. .................... | 370/331 |
| 2007/0218908 | A1 * | 9/2007 | Kang et al. .................... | 455/442 |
| 2008/0020767 | A1 * | 1/2008 | Takai ............................. | 455/436 |
| 2008/0108369 | A1 * | 5/2008 | Visotsky et al. .............. | 455/455 |
| 2009/0088164 | A1 * | 4/2009 | Shen et al. .................... | 455/436 |
| 2010/0087196 | A1 * | 4/2010 | Lee et al. ...................... | 455/436 |

FOREIGN PATENT DOCUMENTS

| | | |
|---|---|---|
| CN | 1925357 A | 3/2007 |
| CN | 101009926 A | 8/2007 |
| CN | 101064911 A | 10/2007 |
| CN | 101472304 B | 5/2010 |
| WO | 99/13671 | 3/1999 |

OTHER PUBLICATIONS

International Search Report issued in corresponding PCT Application No. PCT/CN2008/073192; Mailed Mar. 5, 2009.

"Part 16: Air Interface for Fixed and Mobile Broadband Wireless Access Systems" The Institute of Electrical and Electronics Engineers., Inc. Aug. 2007.

Office Action issued in corresponding Chinese Patent Application No. 200710161050.8; issued Nov. 6, 2009.

* cited by examiner

*Primary Examiner* — Bob Phunkulh
(74) *Attorney, Agent, or Firm* — Brinks Hofer Gilson & Lione

(57) ABSTRACT

A method, system and device for MS handover are provided in an embodiment of the present invention. The method includes: receiving the handover-assisting information from the RS by the serving MR-BS; determining whether to recommend the RS to the MS as the target station according to the handover-assisting information by the serving MR-BS. The embodiments of the present invention enable the serving MR-BS to obtain related information from the RS and the serving MR-BS of the MS to better ascertain the potential target station and related information to be recommended to the MS. This helps improve the handover performance of the MS and reduce the failure rate.

20 Claims, 24 Drawing Sheets

METHOD, SYSTEM AND DEVICE FOR MOBILE STATION HANDOVER

CROSS-REFERENCE TO RELATED APPLICATIONS

This application is a continuation of International Application No. PCT/CN2008/073192, filed on Nov. 25, 2008, which claims priority to Chinese Patent Application No. 200710161050.8, filed on Dec. 24, 2007, both of which are hereby incorporated by reference in their entireties.

FIELD OF THE INVENTION

The invention relates to the field of mobile communications technologies, and in particular, to a method, system and device for Mobile Station (MS) handover.

BACKGROUND

With the continuous development of advancing communications technologies, the communications system is required to have an increasingly higher access speed. Thus, the Broadband Wireless Access (BWA) communications system is attracting increasing attention. The wireless communications theory shows that the higher a transmitting frequency is, the faster radio waves attenuate over the distance will be. The 802.16e-compliant communications system provides a relatively high working frequency, so its Base Station (BS) has a limited coverage. Therefore, members of the IEEE802 relay working team are setting a standard for multi-hop wireless relay communications system that supports 802.16e Mobile Station (MS) and communicates with BS through one or more Relay Stations (RSs).

FIG. 1 shows a flowchart of MS handover process triggered by MS in the prior art. The process includes the following steps:

Step S101: An MS scans one or more neighboring BSs and obtains the information about the neighboring BS, for example, relative time delay, receive signal strength indicator (RSSI), and carrier-to-interference-and-noise ratio (CINR). Optionally, if the MS performs a correlative scan on the neighboring BS, it is possible to estimate the effective time range of the channel parameters obtained by the MS. The MS reports such information and other scanned information to the serving BS through a scanning result report message (MOB_SCN_REP).

Step S102: The MS sends an MS Handover Request message (MOB_MSHO_REQ) to the serving BS and indicates one or more target BSs and other information to the serving BS, where said one or more target BSs are target BSs that the MS requests handover to.

Step S103: The serving BS determines to negotiate with one or more neighboring BSs regarding the handover information according to the information from the MS and related information about its own maintenance, such as MS UL PHY quality information.

Step S104: The serving BS negotiates, through a backbone network, with each neighboring BS determined in step S103, regarding the handover information. Specifically, the information that the serving BS may provide to the backbone network includes: network access information such as MS authentication, key and basic capacity, PHY quality information between the MS and the serving BS, PHY quality information between the MS and neighboring BS, and related information about MS current service flow and relevant QoS information; the information that the neighboring BS may provide to the backbone network includes: QoS information which may support each MS service flow, service level forecast, HO optimization information and time information for the MS to perform special ranging.

Step S105: According to the MS information from the backbone network and information about BS's own maintenance, the serving BS will take one or more neighboring BSs as target BS(s) which is recommended to MS, and ascertain other handover-related information.

Step S106: The serving BS sends a BS Handover Response message (MOB_BSHO-RSP) to the MS and indicates to the MS the target BS and other handover-related information ascertained in step S105.

Step S107: The MS sends a Handover Indication message (MOB_HO-IND) to the serving BS and indicates to the serving BS the target BS (there is only one target BS) and other handover-related information ascertained by the MS.

Step S108: The MS performs handover in the target BS; simultaneously, the serving BS exchanges information with the target BS through the backbone network to support MS handover.

FIG. 2 shows a flowchart of MS handover process triggered by BS in the prior art. The process includes the following steps:

Step S201: An MS scans one or more neighboring BSs and obtains the information relating to neighboring BS, for example, relative time delay, RSSI, and CINR. Optionally, if the MS performs a correlative scan on the neighboring BS, it is possible to estimate the effective time range that the channel parameters obtained by the MS. The MS reports such information and other scanned relative information to the serving BS through MOB_SCN_REP.

Step S202: The serving BS determines to negotiate with one or more neighboring BSs regarding the handover information according to the information from the MS and information about its own maintenance, such as MS UL PHY quality information.

Step S203: The serving BS negotiates with each neighboring BS determined in step S202 regarding the handover information through a backbone network. Specifically, the information that the serving BS may provide to the backbone network includes: network access information such as MS authentication, key and basic capacity, PHY quality information between the MS and the serving BS, PHY quality information between the MS and neighboring BS, and information about MS current service flow and relevant QoS information; the information that the neighboring BS may provide to the backbone network includes: QoS information which may support each MS service flow, service level forecast, HO optimization information, and time information for providing the MS with special ranging opportunity.

Step S204: According to the MS information from the backbone network and information about BS's own maintenance, the serving BS will take one or more neighboring BSs as target BS(s) which is recommended to MS and ascertains other handover-related information.

Step S205: The serving BS sends MOB_BSHO-REQ to the MS and indicates to the MS the target BS and other handover-related information ascertained in step S204.

Step S206: The MS sends MOB_HO-IND to the serving BS and indicates to the serving BS the target BS (there is only one target BS) and other handover-related information ascertained by the MS.

Step S207: The MS performs handover in the target BS; simultaneously, the serving BS exchanges information with the target BS through the backbone network to support MS handover.

FIG. 3 shows a typical MS handover process with non-transparent RS in the prior art. In the MR network, the nontransparent RS has the same tag type and unique tag as the MR-BS, broadcasting pilot carrier and control signaling (such as MAP signaling). For the MS, the nontransparent RS is a BS, where both RS#2 and RS#3 are nontransparent RSs.

The serving MR-BS exchanges information with the neighboring MR-BS through the backbone network; the serving MR-BS is the service base station of MS and RS#2; the neighboring MR-BS is the service base station of RS#3. For the MS, the serving MR-BS is MS's service base station and RS#2 and RS#3 are MS's neighboring base station.

FIG. 4 shows a flowchart of a handover process triggered by the MS in the prior art. The process includes the following steps:

Step S401: The MS sends MOB_SCN_REP to the serving MR-BS to report the DL PHY quality information of RS#2 and RS#3 (for example, DL RSSI average).

Step S402: The MS sends MOB_MSHO-REQ to the serving MR-BS and indicates one or more potential target stations that the MS requests handover to and other information.

Step S403: The serving MR-BS determines whether to take RS#2 as the potential target station recommended for MS handover based on the MS information and other maintenance information, and determines whether to take RS#3 as the potential target station recommended for MS handover.

Step S404: The serving MR-BS ascertains all the potential target stations recommended to the MS and related information.

Step S405: The serving M R-BS sends MOB-BSHO-RSP to the MS and indicates to the MS one or more potential target stations recommended and related information.

Step S406: The MS sends MOB_HO-IND to the serving MR-BS and indicates the handover target station (only one) and related information ascertained by the MS. If the ascertained handover target station is RS#2, the MS performs handover to RS#2 after sending MOB-HO-IND. If the MS performs general handover (initial ranging is intended for competition) on RS#2, RS#2 may exchange information with the serving MR-BS through an air interface if necessary, to support MS handover. If the MS performs fast handover (initial ranging is intended for a special purpose) on RS#2, before the MS performs handover, the serving MR-BS may instruct, through an air interface, RS#2 to allocate the MS the ranging opportunity.

If the ascertained handover target station is RS#3, the MS performs the operation of handover to RS#3 after sending MOB_HO-IND. If the MS performs general handover (initial ranging is intended for competition) on RS#3, RS#3 may exchange information with the neighboring MR-BS through an air interface if necessary, to support MS handover. If the MS performs fast handover (initial ranging is intended for a special purpose) on RS#3, before the MS performs handover, the serving MR-BS may instruct, through an air interface, RS#3 to allocate the MS the ranging opportunity. At the same time, the serving MR-BS may exchange information with the neighboring MR-BS through the backbone network to support MS handover.

FIG. 5 shows a flowchart of a handover process triggered by the MR-BS in the prior art. The process includes the following steps:

Step S501: The MS sends MOB_SCN_REP to the serving MR-BS to report the DL PHY quality information of RS#2 and RS#3 (for example, DL RSSI average).

Step S502: The serving MR-BS determines whether to take RS#2 as the potential target station recommended for MS handover based on the MS information and other maintenance information, and determines whether to take RS#3 as the potential target station recommended for MS handover.

Step S503: The serving MR-BS ascertains all the potential target stations recommended to the MS and related information.

Step S504: The serving MR-BS sends MOB-BSHO-REQ to the MS and indicates to the MS one or more potential target stations recommended and related information.

Step S505: The MS sends MOB_HO-IND to the serving MR-BS and indicates the handover target station (there is only one target station) and related information ascertained by the MS.

If the ascertained handover target station is RS#2, the MS performs the operation of handover to RS#2 after sending MOB-HO-IND. If the MS performs general handover (initial ranging is intended for competition) on RS#2, RS#2 may exchange information with the serving MR-BS through an air interface if necessary, to support MS handover. If the MS performs fast handover (initial ranging is intended for a special purpose) on RS#2, before the MS performs handover, the serving MR-BS may instruct, through an air interface, RS#2 to allocate the MS the ranging opportunity.

If the ascertained handover target station is RS#3, the MS performs the operation of handover to RS#3 after sending MOB_HO-IND. If the MS performs general handover (initial ranging is intended for competition) on RS#3, RS#3 may exchange information with the neighboring MR-BS through an air interface if necessary, to support MS handover. If the MS performs fast handover (initial ranging is intended for a special purpose) on RS#3, before the MS performs handover, the serving MR-BS may instruct, through an air interface, RS#3 to allocate the MS the ranging opportunity. At the same time, the serving MR-BS may exchange information with the neighboring MR-BS through the backbone network to support MS handover.

Serving stations of the MS may be a nontransparent RS served by the serving MR-BS. Assuming that RS#1, MS handover is performed as shown in FIG. 6 and both the MS and the serving MR-BS may trigger an MS handover request. If the MS triggers the handover request, RS#1 will forward the handover request of the MS to the serving MR-BS, forward the handover response of the serving MR-BS to the MS, and then forward MS handover indication to the serving MR-BS. If the serving MR-BS triggers the handover request, RS#1 will forward the handover request of the serving MR-BS to the MS and forward the MS handover indication to the serving MR-BS. Other processes are the same as the above two processes.

FIG. 7 shows a flowchart of a process of handover to RS#2 through RS#1 and the serving MR-BS triggered by the MS in the prior art. The process includes the following steps:

Step S701: The MS sends MOB-SCN REP to RS#1, including DL RSSI of RS#2 detected by the MS and other scanned information.

Step S702: RS#1 forwards MOB_SCN-REP to the serving MR-BS.

Step S703: The MS sends MOB_MSHO-REQ to RS#1, including the tag of potential target station that the MS requests handover to and related information.

Step S704: RS#1 forwards MOB_MSHO-REQ to the serving MR-BS.

Step S705: The serving MR-BS determines whether to take RS#2 as the potential target station recommended for MS handover based on MS information and other maintenance information.

Step S706: The serving MR-BS ascertains all the potential target stations recommended to the MS and related information.

Step S707: The serving MR-BS sends MOB_BSHO-RSP to RS#1, including the tag list of the potential target stations recommended to the MS by the serving MR-BS and related information.

Step S708: RS#1 forwards MOB_BSHO-RSP to the MS.

Step S709: The MS sends MOB_HO-IND to RS#1, including the tag of the handover target station and related information ascertained by the MS.

Step S710: RS#1 forwards MOB_HO-IND to the MS.

If the ascertained handover target station is RS#2, the MS performs the operation of handover to RS#2 after sending MOB-HO-ND. If the MS performs general handover (initial ranging is intended for competition) on RS#2, RS#2 may exchange information with the serving MR-BS through an air interface if necessary, to support MS handover. If the MS performs fast handover (initial ranging is intended for a special purpose) on RS#2, before the MS performs handover, the serving MR-BS may instruct, through an air interface, RS#2 to allocate the MS the ranging opportunity.

In the process of implementing the embodiments of the present invention, the inventor found that the prior art has at least the following problems: If the neighboring RS of the MS is located in the serving MR cell (RS#2) or the neighboring MR cell (RS#3), the basic information is incomplete, based on which the serving MR-BS of the RS determines whether the RS is suitable for serving as the potential target station of the MS. For example, the failure of the MR-BS of the RS to obtain the current PHY service quality information from subsidiary stations at the RS or obtain the channel quality information between the MS and the target stations detected by the RS may cause inaccurate information to be carried in MOB_BSHO-REQ/RSP sent by the MR-BS of the MS to the MS, which may finally degrade the handover performance of the MS, such as lengthy handover time delay or handover failure.

SUMMARY

A method, system and device for MS handover are provided in an embodiment of the present invention to prevent performance degradation of MS handover caused by an inaccurate judgment about whether the neighboring RS of the MS is suitable for serving as the potential target station of the MS or not because the serving MR-BS of the neighboring RS of the MS fails to obtain the information of the neighboring RS from the MS.

To achieve the above-mentioned goal, a method for MS handover is provided in an embodiment of the present invention. The method includes:

receiving, by the serving MR-BS, handover-assisting information from the Relay Station (RS), where the handover-assisting information includes Uplink Physical Layer (UL PHY) quality information of the MS; and determining, by the serving MR-BS, whether to recommend the RS to the MS as a target station according to the handover-assisting information.

A system for MS handover is also provided in an embodiment of the present invention. The system includes an RS, a serving MR-BS of the RS, and at least one MS. The RS is configured to send the handover-assisting information to the serving MR-BS of the RS, where the handover-assisting information further includes UL PHY quality information of the MS. The serving MR-BS of the RS is configured to determine whether to recommend the RS to the MS as the target station according to the handover-assisting information.

A serving MR-BS is also provided in an embodiment of the present invention, including a handover-assisting information processing module, a judging module, and a recommending module. The handover-assisting information processing module is configured to receive the handover-assisting information from the RS, where the handover-assisting information further includes UL PHY quality information of the MS. The judging module is configured to determine whether to recommend the RS to the MS as a target station according to the handover-assisting information. The recommending module is configured to indicate the handover-related information to the MS according to the result from the judging module.

A serving MR-BS is also provided in an embodiment of the present invention, including a handover-assisting information processing module and a communications module. The handover-assisting information processing module is configured to receive handover-assisting information from an RS. The communications module is configured to communicate with the current serving MR-BS of the MS through a backbone network and send the handover-assisting information received by the handover-assisting information processing module to the current serving MR-BS of the MS, or judge whether the RS is the target station of the MS according to the handover-assisting information received by the handover-assisting information processing module and return the result of judgment to the current serving MR-BS of the MS.

Compared with the prior art, embodiments of the present invention have the following advantages: Embodiments of the present invention enable the serving MR-BS of the neighboring RS of the MS to obtain related information from the neighboring RS of the MS and the serving MR-BS of the MS to determine whether the target stations are suitable candidates for the MS. This helps improve the handover performance of the MS and reduce the failure rate.

DETAILED DESCRIPTION

The present invention is described below with reference to the drawings and embodiments:

Embodiments of the present invention enable the serving MR-BS of the neighboring RS of the MS to communicate with the RS, enable the serving MR-BS of the RS to obtain related information of the RS, for example, MS's association information maintained at the RS, interference measure result, related information about whether the RS suggests to take the RS itself as the potential target station of the MS, and related information reported through the RS, and enable the serving MR-BS of the RS to determine whether the RS is suitable for serving as the potential target station of the MS. Therefore, the serving MR-BS of the MS can better ascertain the target stations to be recommended to the MS, which helps improve the handover performance of the MS and reduce failure rate.

For the MS, the serving station of the MS can be either the serving MR-BS, or the nontransparent RS served by the serving MR-BS. The following embodiments will be described with reference to the example that the serving station of the MS is the serving MR-BS, but it is understandable that embodiments of the present invention are not limited to the example that the serving station of the MS is the serving MR-BS and should cover the example that the serving station of the MS is the nontransparent RS served by the serving MR-BS. A method for information interaction between multiple RSs and the serving MR-BS of the MS or the neighboring MR-BS of the MS when the serving station of the MS is the MR-BS is provided in following embodiments of the present invention.

Figure 1A:
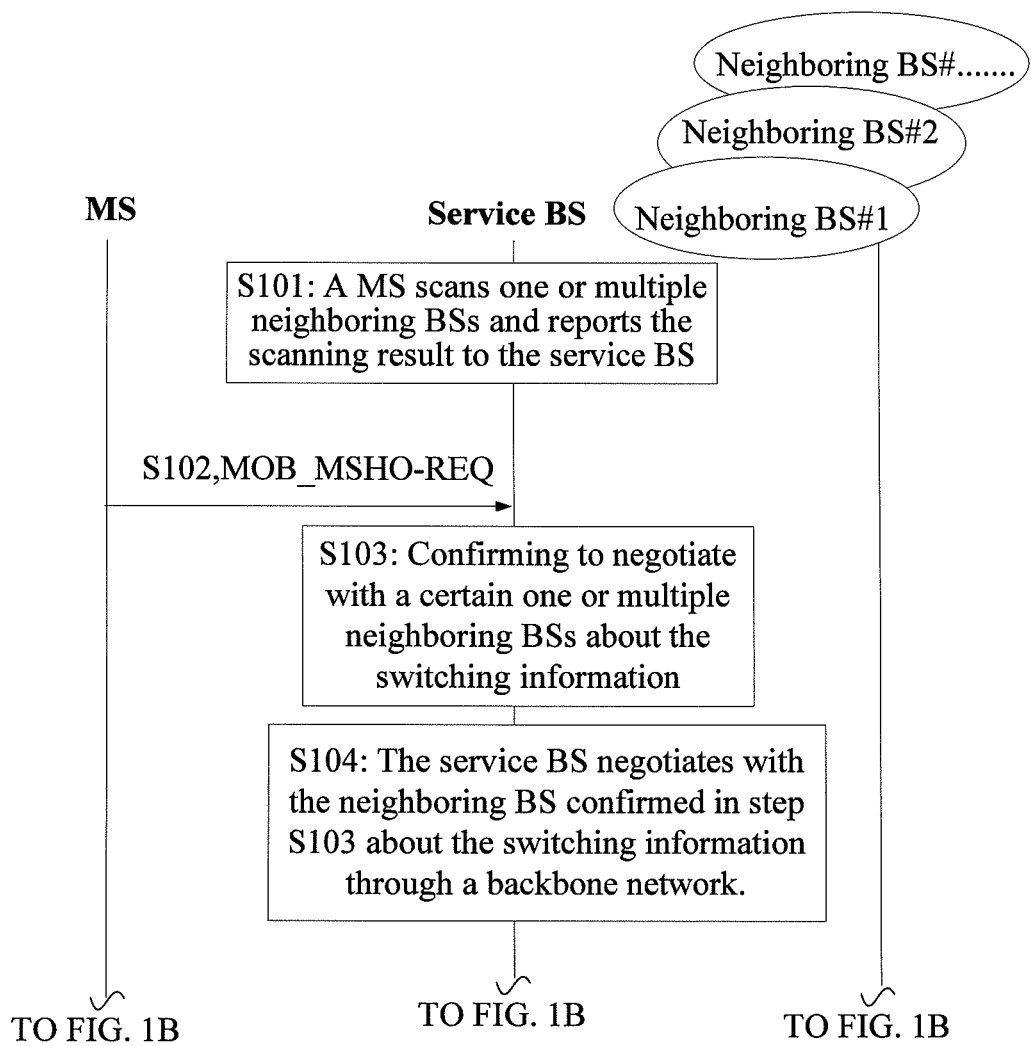
FIG. 1 shows a flowchart of MS handover process triggered by MS in the prior art.
Figure 1B:
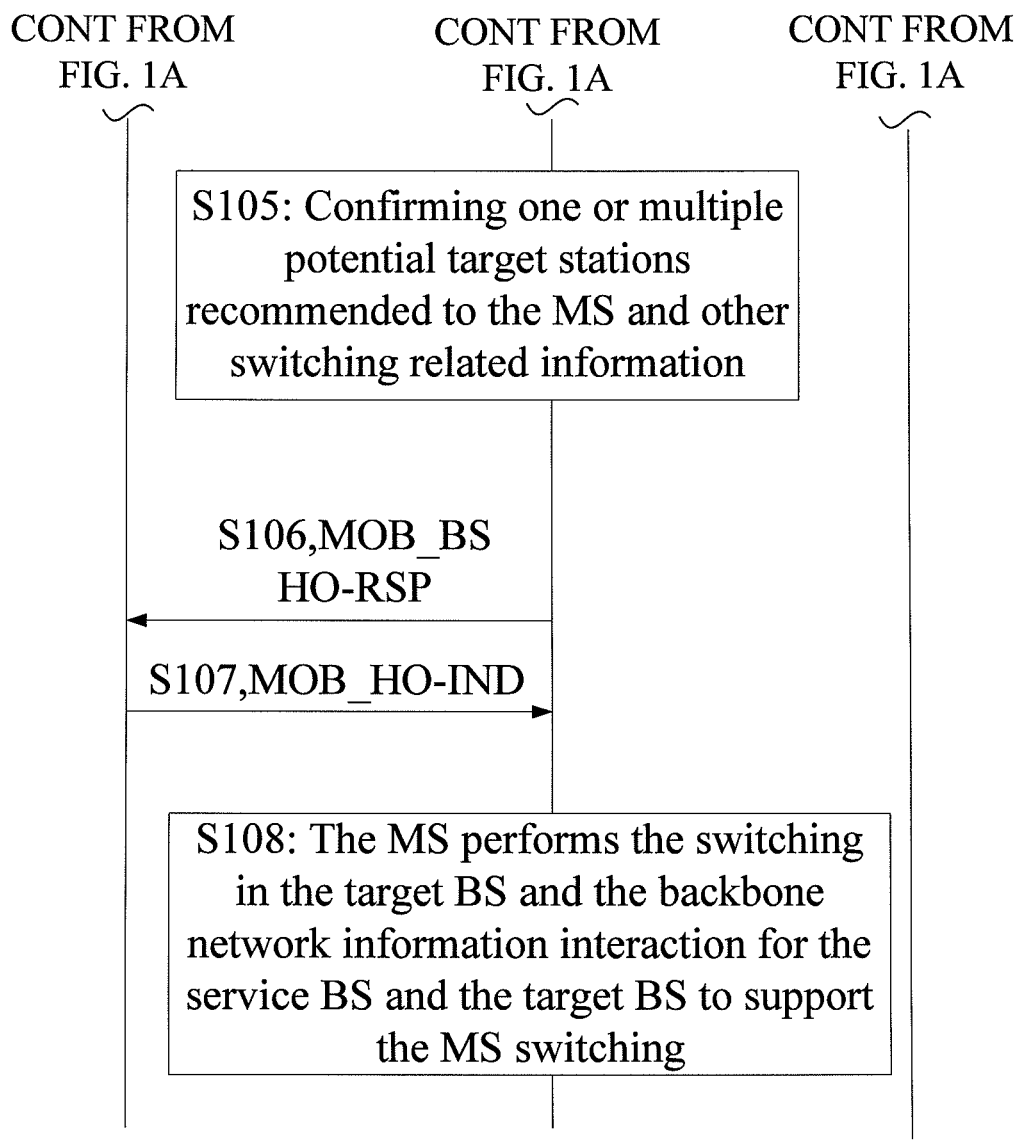
Figure 2A:
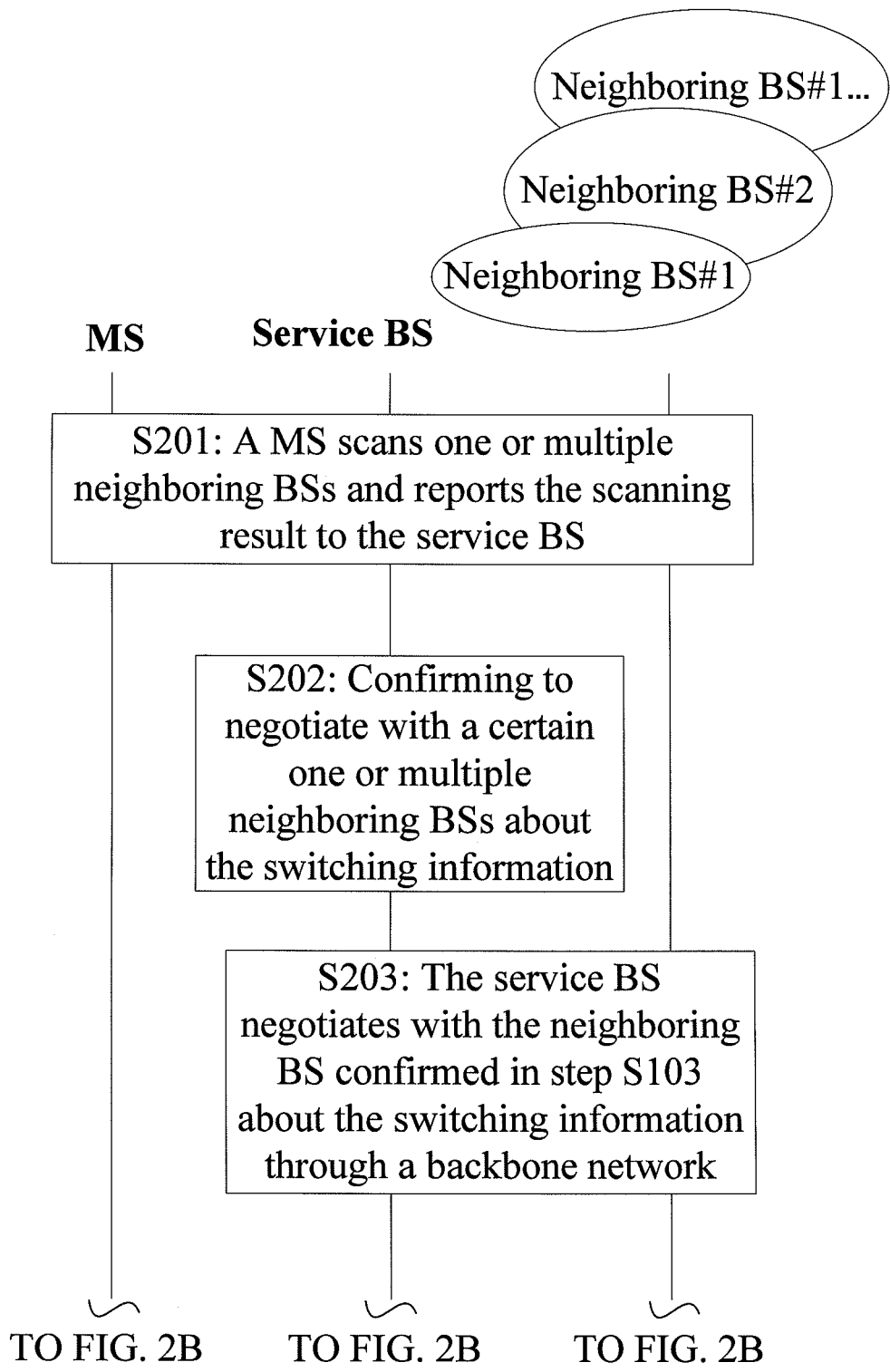
FIG. 2 shows a flowchart of MS handover process triggered by the serving BS in the prior art.
Figure 2B:
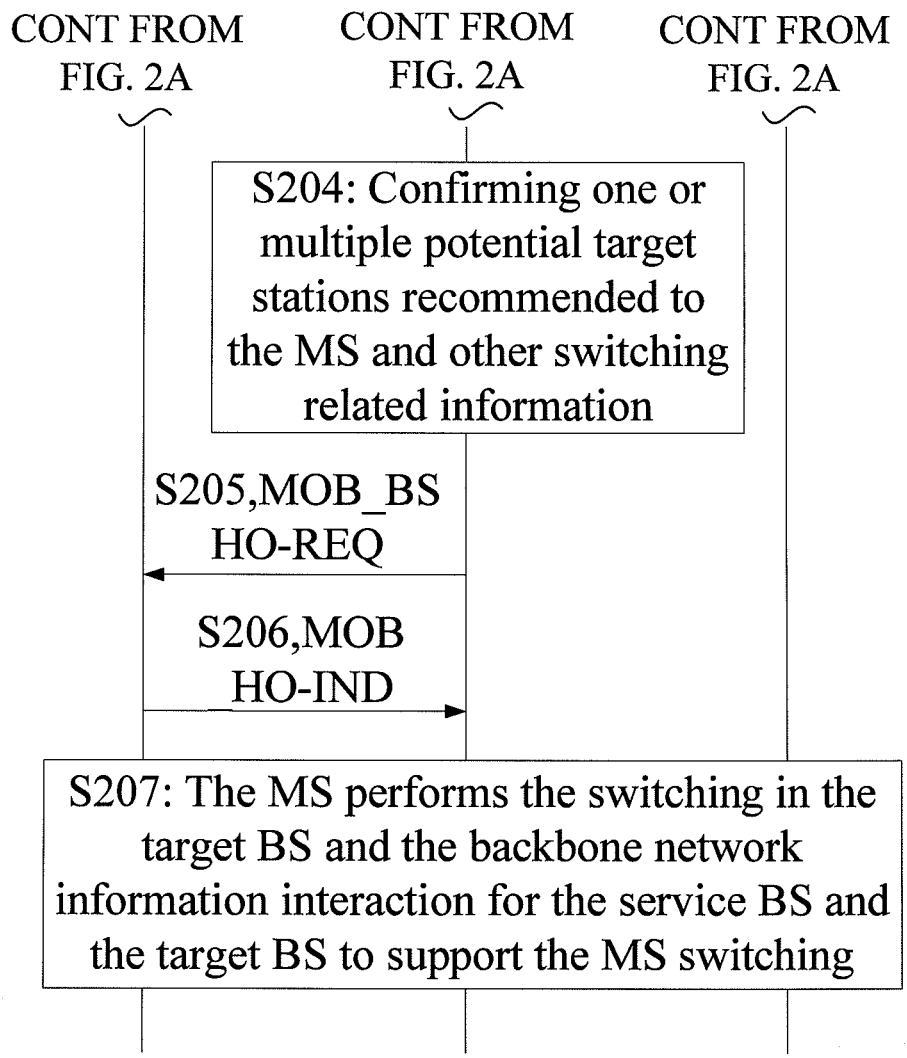
Figure 3:
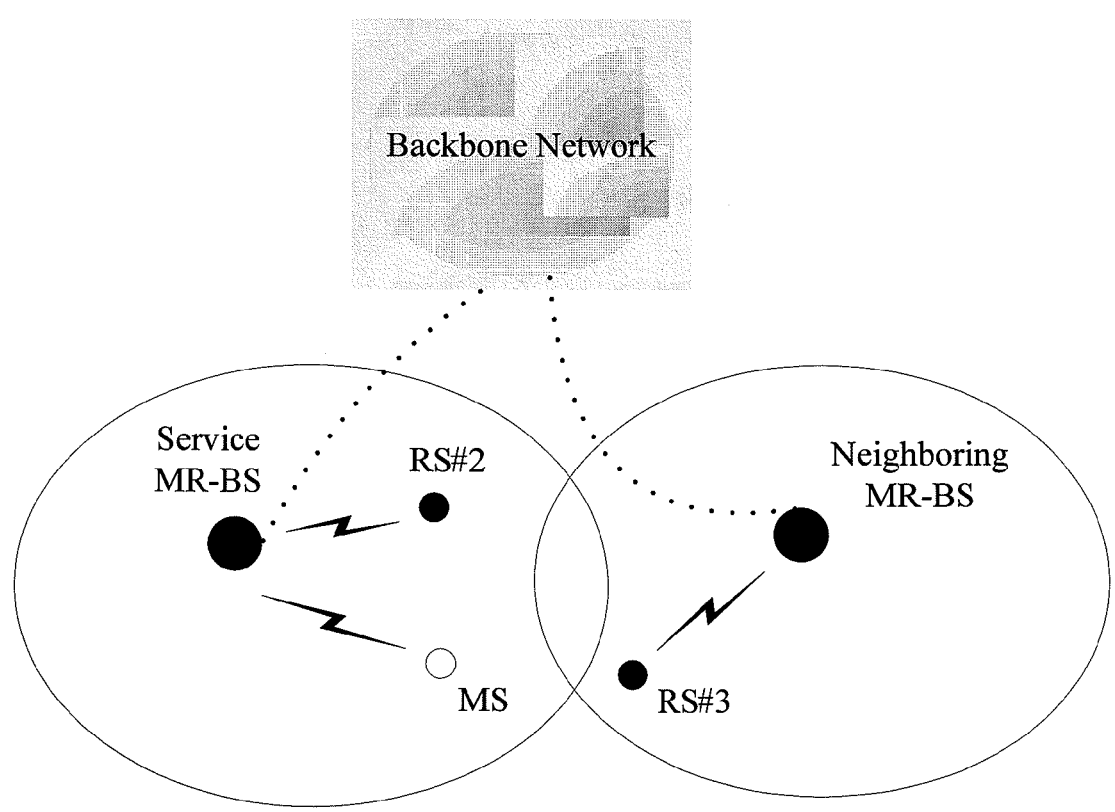
FIG. 3 shows a typical MS handover process with non-transparent RS in the prior art.
Figure 4:
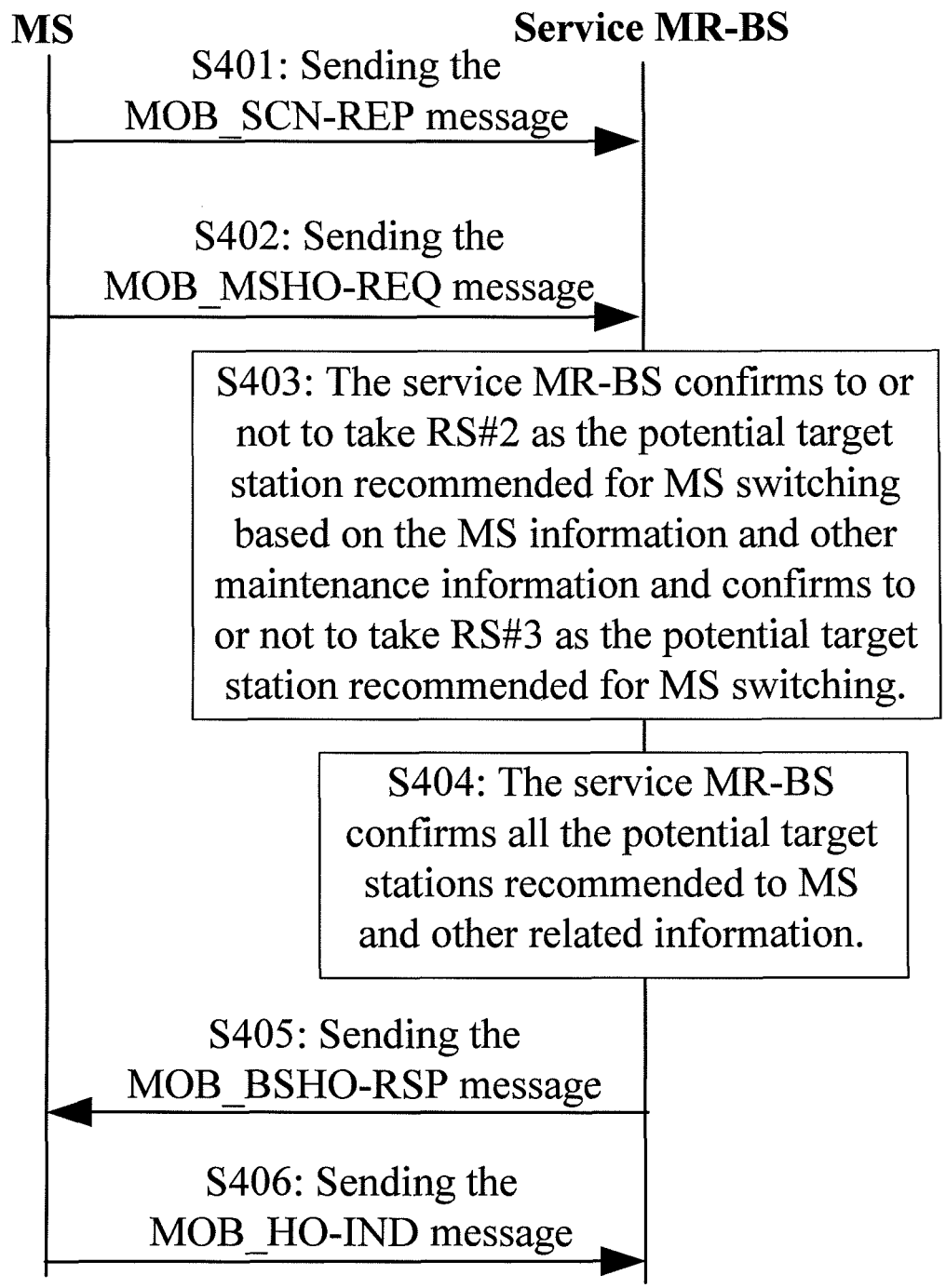
FIG. 4 shows a flowchart of a handover process triggered by the MS in the prior art.
Figure 5:
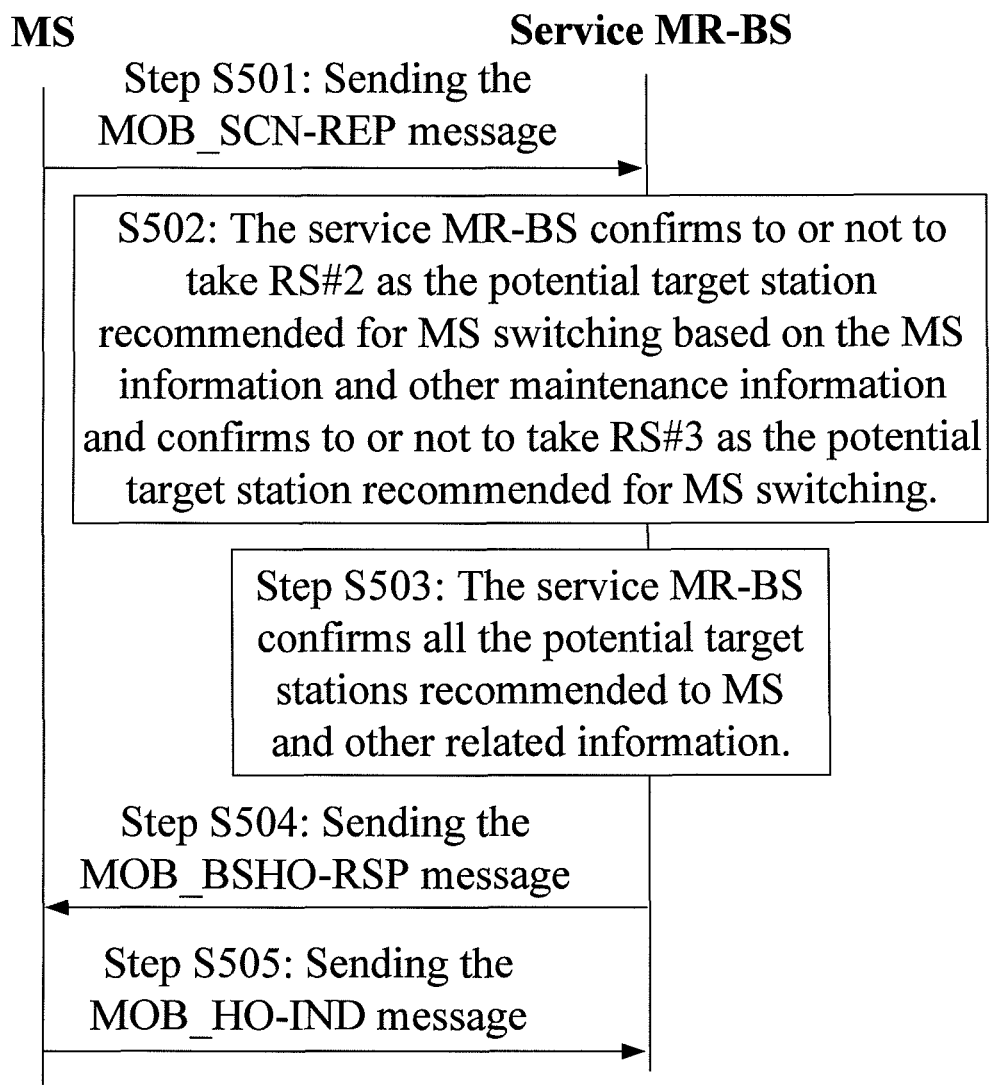
FIG. 5 shows a flowchart of a handover process triggered by the MR-BS in the prior art.
Figure 6:
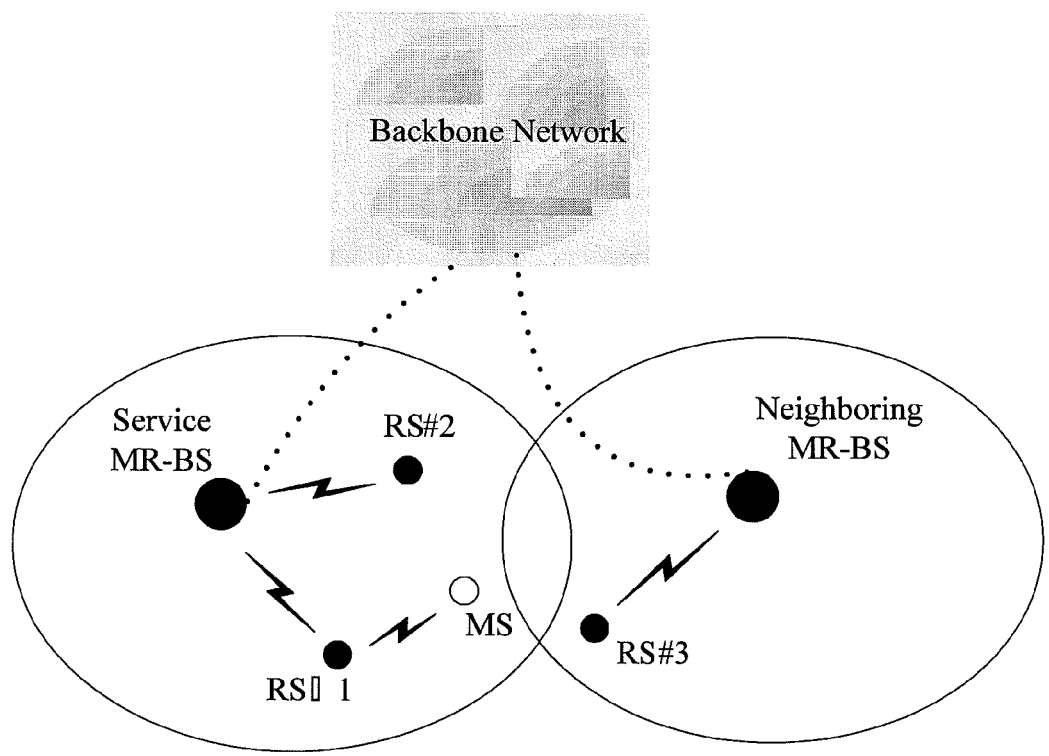
FIG. 6 shows an MS handover process in the prior art.
Figure 7:
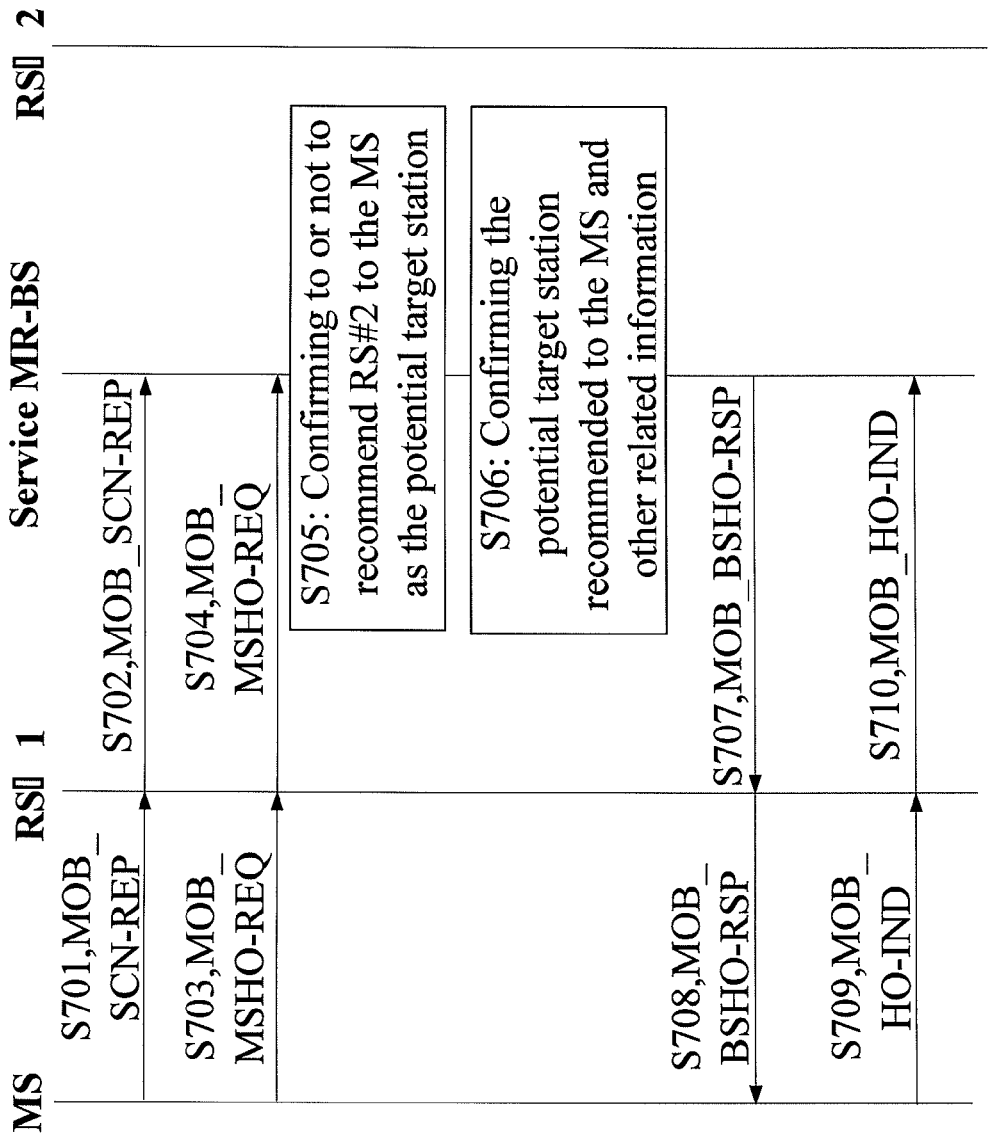
FIG. 7 shows a flowchart of a process of handover, triggered by the MS, to RS#2 through RS#1 and the serving MR-BS in the prior art.
Figure 8:
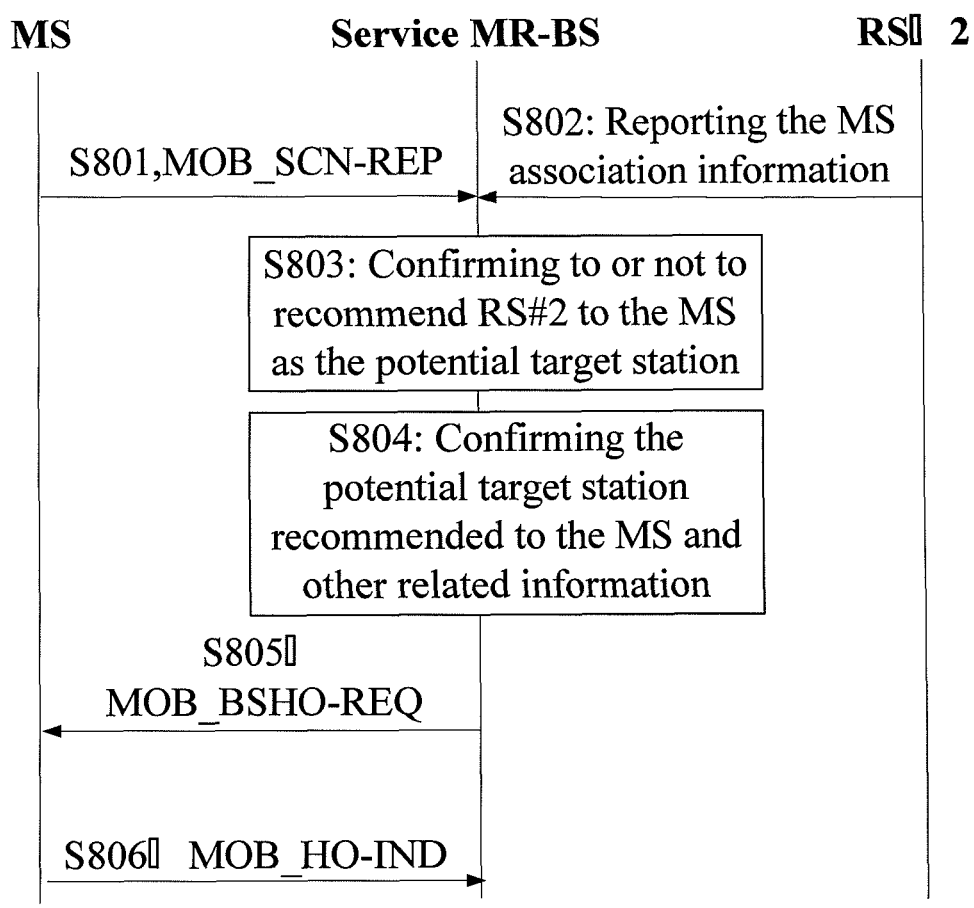
FIG. 8 shows a flowchart of a handover process triggered by the serving MR-BS while the neighbor station of the MS includes RS#2 in embodiment 1 of the present invention.

FIG. 8 shows a flowchart of a handover process triggered by the serving MR-BS while the neighbor station of the MS includes RS#2 in embodiment 1 of the present invention. In the process of implementing this embodiment, RS#2 unsolicitedly reports the MS's association information to the serving MR-BS during or after the association by the MS, when there may be a specific triggering condition to trigger the active report by RS#2 that RS#2 has ascertained the successful process of receiving the initial ranging code of the MS or receiving the RNG-REQ carried with MS MAC address from the MS, or has ascertained the satisfied channel quality information (for example, UL CINR of the MS is greater than a given threshold) between the MSs after receiving the RNG-REQ carried with MS MAC address from the MS.

It should be noted that there is no time sequence between the process of reporting the MS's association information to the serving MR-BS unsolicitedly by RS#2 and the process of sending MOB_SCN-REP to the serving MR-BS by the MS, where the association information includes: uplink physical layer (UL PHY) quality information of the MS obtained by RS#2 (for example, UL CINR average and UL RSSI average), and/or effective time range of the channel parameters obtained by the MS during association and estimation by RS#2. The embodiment includes the following:

Step S801: The MS sends MOB-SCN_REP to the serving MR-BS, including DL RSSI of RS#2 detected by the MS and other scanned information.

Step S802: RS#2 reports the association information to the serving MR-BS. Step S801 and step S802 can be simultaneous steps without time sequence.

Step S803: Under a given qualified triggering condition, the serving MR-BS determines whether to recommend RS#2 to the MS as the potential target station according to the association information reported by RS#2 and other maintenance information.

Step S804: The serving MR-BS ascertains all the potential target stations recommended to MS and related information. Herein, all potential target stations recommended to the MS and ascertained by the serving MR-BS may include the RS in the serving MR cell, the neighboring MR-BS and the RS in the neighboring MR cell.

Step S805: The serving MR-BS sends MOB_BSHO-REQ message to the MS, including the tag list of the potential target stations recommended to the MS by the serving MR-BS and related information.

Step S806: The MS sends MOB_HO-IND message to the serving MR-BS, including the tag of the handover target station and related information ascertained by the MS.

RS#2 may report the association information to the serving MR-BS in the following two ways:

1. The association-related information may be reported to the serving MR-BS through RNG-REQ and an association Type/Length/Value (TLV) for carrying association-related information may be added in the RNG-REQ message.

2. RS#2 sends the association report to the serving MR-BS, including the MS tag (for example, MS MAC address) and association-related information.

In step S1002 in the foregoing embodiments, other maintenance information based on which the serving MR-BS determines whether to recommend RS#2 to the MS as the potential target station can be the interference measure result. The information is derived as follows: If necessary (for example, when receiving the association information reported by RS#2, or when assigning a basic CID and primary managing CID for the MS), the serving MR-BS may instruct the RS to report the interference measure result (or instruct RS#2 to conduct an interference measure and report the result). The specific examples that the serving MR-BS instructs RS#2 to conduct an interference measure and report the result are as follows: The MR-BS starts an interference measuring mechanism and instructs the RS to test the interference and report the result through RS_NBR-MEAS-REP.

Figure 9:
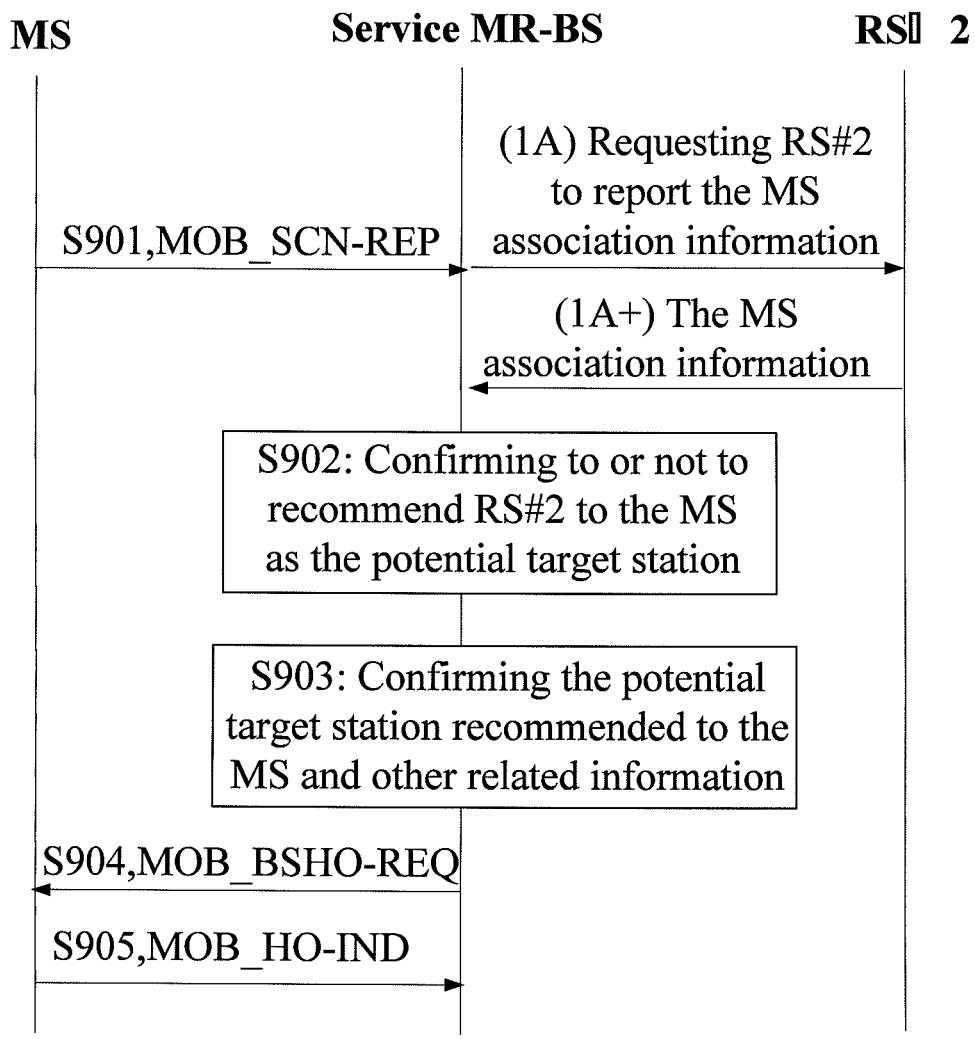
FIG. 9 shows a flowchart of a handover process triggered by the serving MR-BS while the neighbor station of the MS includes RS#2 in embodiment 2 of the present invention.

FIG. 9 shows a flowchart of a handover process triggered by the serving MR-BS while the neighbor station of the MS includes RS#2 in embodiment 2 of the present invention. In the process of implementing this embodiment, during or after the association between RS#2 and the MS, the serving MR-BS requests RS#2 for the MS's association information (Step 1A), and RS#2 responds to the MS's association information after receiving the request from the serving MR-BS. During or after the association between RS#2 and the MS, there may be a specific triggering condition to trigger the serving MR-BS to request RS#2 for the MS's association information that the serving MR-BS has received the indication of successful MS ranging sent by RS#2, or has received the RNG-REQ message carried with MS MAC address forwarded by RS#2, or has ascertained the basic CID and primary managing CID assigned by RS#2. In this embodiment, there is no time sequence between the process of requesting RS#2 for the MS's association information by the serving MR-BS and the process of sending the MOB_SCN-REP message to the serving MR-BS by the MS. This embodiment includes the following steps:

Step S901: The MS sends MOB-SCN_REP to the serving MR-BS, including DL RSSI of RS#2 detected by the MS and other scanned information.

Step S902: It is assumed that the serving MR-BS has already requested RS#2 for the MS's association information at this moment and received the association information reported by RS#2. Once a given triggering condition meets the requirement, the serving MR-BS determines whether to recommend RS#2 to the MS as the potential target station according to the association information reported by RS#2 and other maintenance information.

Step S903: The serving MR-BS ascertains all the potential target stations recommended to MS and related information. Herein, all potential target stations recommended to the MS and ascertained by the serving MR-BS may include the RS in the serving MR cell, the neighboring MR-BS and the RS in the neighboring MR cell.

Step S904: The serving MR-BS sends MOB_BSHO-REQ message to the MS, including the tag list of the potential target stations recommended to the MS by the serving MR-BS and related information.

Step S905: The MS sends MOB_HO-IND message to the serving MR-BS, including the tag of the handover target station and related information ascertained by the MS.

The serving MR-BS may request RS#2 to report the MS's association information and RS#2 may respond the MS's association information in the following two ways:

1. The serving MR-BS sends the RNG-RSP message to RS#2 to indicate the assignment of basic CID for the MS. Once RS#2 receives the indication, the request from the serving MR-BS for the MS's association information succeeds. RS#2 sends the association report to the serving MR-BS, including the MS tag and association-related information.

2. The serving MR-BS sends the RNG-RSP message to RS#2 to indicate the assignment of the basic CID for the MS. A TLV is added in the message. The value of 1 means request, and 0 means no request. Once receiving the request, RS#2 sends the association report to the serving MR-BS, including the MS tag and association-related information.

In step S902 in the foregoing embodiments, other maintenance information based on which the serving MR-BS determines whether to recommend RS#2 to the MS as the potential target station can be the interference measure result. The information is derived as follows: If necessary (for example, when receiving the association information reported by RS#2, or when assigning a basic CID and primary managing CID for the MS), the serving MR-BS may instruct the RS to report the interference measure result (or instruct RS#2 to conduct an interference measure and report the result). The specific examples that the serving MR-BS instructs RS#2 to conduct an interference measure and report the result are as follows: The MR-BS starts an interference measuring mechanism and instructs the RS to test the interference and report the result through RS_NBR-MEAS-REP message.

Figure 10:
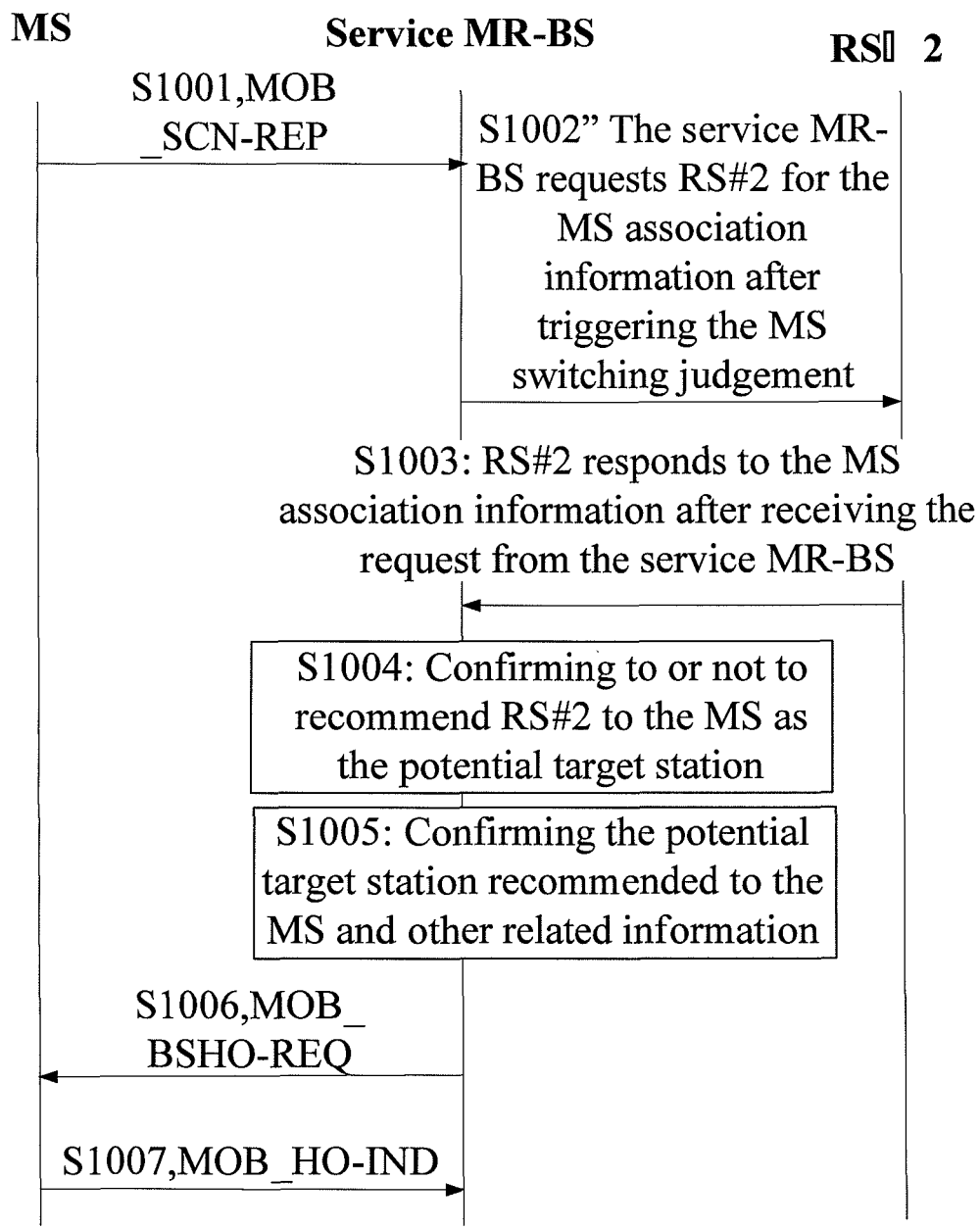
FIG. 10 shows a flowchart of a handover process triggered by the serving MR-BS while the neighbor station of the MS includes RS#2 in embodiment 3 of the present invention.

FIG. 10 shows a flowchart of a handover process triggered by the serving MR-BS while the neighbor station of the MS comprises RS#2 in embodiment 3 of the present invention. In the process of implementing this embodiment, the serving MR-BS requests RS#2 for the MS's association information of ter triggering MS handover judgment. The embodiment comprises the following steps:

Step S1001: The MS sends MOB-SCN_REP message to RS#1, including DL RSSI of RS#2 detected by the MS and other scanned information.

Step S1002: The serving MR-BS requests RS#2 for the MS's association information after triggering MS handover judgment.

Step S1003: RS#2 responds the MS's association information after receiving the request from the serving MR-BS.

Step S1004: The serving MR-BS determines whether to recommend RS#2 to the MS as the potential target station according to the association information reported by RS#2 and other maintenance information.

Step S1005: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1006: The serving MR-BS sends MOB_BSHO-REQ message to the MS, including the tag list of the potential target stations recommended to the MS by the serving MR-BS and related information.

Step S1007: The MS sends MOB_HO-IND message to the serving MR-BS, including the tag of the handover target station and related information ascertained by the MS.

Optionally in step S1002, in addition to the MS's association information, the serving MR-BS also requests RS#2 to report the service information (for example, CINR statistics, BER PHY service quality information, available downlink wireless resources, and available uplink wireless resources) for subsidiary MSs and/or RSs, and/or the interference measure result.

The serving MR-BS requests RS#2 for the MS's association information and other optional information, and RS#2 responds to that in the following ways: The serving MR-BS sends the handover information request to RS#2, including the MS tag; RS#2 responds to the handover response, including the MS tag, association-related information as well as the service information of subsidiary MSs and/or RSs and/or interference measure results.

Figure 11:
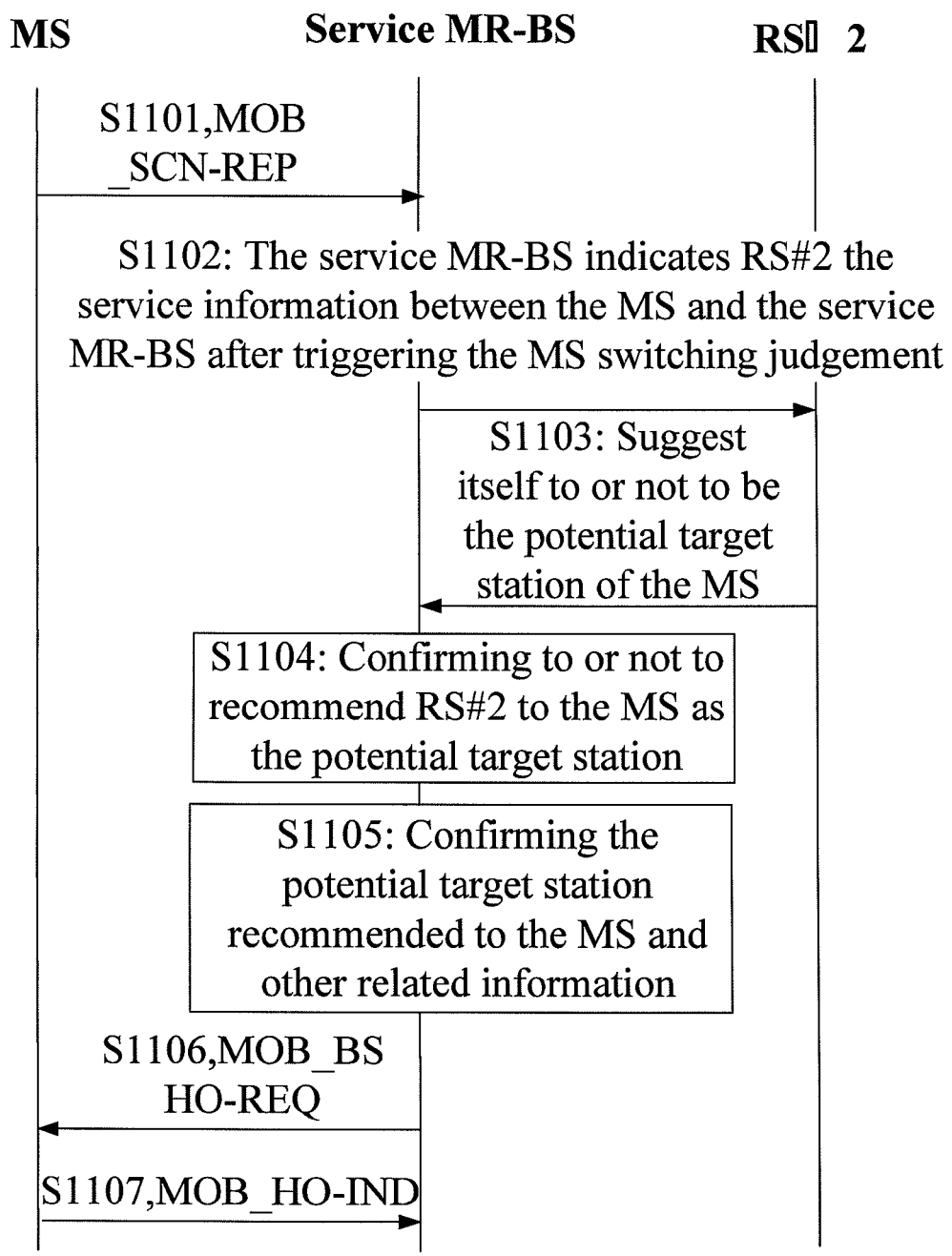
FIG. 11 shows a flowchart of a handover process triggered by the serving MR-BS while the neighbor station of the MS includes RS#2 in embodiment 4 of the present invention.

FIG. 11 shows a flowchart of a handover process triggered by the serving MR-BS while the neighbor station of the MS includes RS#2 in embodiment 4 of the present invention. In the process of implementing this embodiment, the serving MR-BS indicates to RS#2 the service information between the MS and the serving MR-BS and/or the service information between the MS and RS#2 after triggering MS handover judgment. RS#2 determines whether to recommend itself as the potential target station of the MS and feeds backs the determined result to the serving MR-BS according to the information indicated by the serving MR-BS and other maintenance information. The embodiment includes the following steps:

Step S1101: The MS sends MOB-SCN_REP message to the serving MR-BS, where the message includes DL RSSI of RS#2 detected by the MS and other scanned information.

Step S1102: After triggering MS handover judgment, the serving MR-BS indicates to RS#2 the service information (for example, RTD, DL PHY quality information, and UL PHY quality information between the MS and the serving MR-BS) between the MS and the serving MR-BS, and/or the service information (for example, DL PHY quality information and UL PHY quality information between the MS and RS#2, and the effective time range of the channel parameters obtained by the MS during association and estimated by RS#2) between the MS and RS#2.

Step S1103: According to the information indicated by the serving MR-BS and other maintenance information, RS#2 determines whether to recommend itself as the potential target station of the MS and feeds back the determined result to the serving MR-BS. Optionally, if RS#2 feeds back a suggestion, RS#2 may feed back the time information during which a fast handover can be conducted from the MS to the serving MR-BS; for an RS of centralized dispatching, the time can be the effective time (one or more frames) of the channel parameters obtained by the MS during association and estimation by RS#2; for an RS of distributed dispatching, the time can be the effective time (one or more frames) of the channel parameters obtained by the MS during association and estimation by RS#2, and/or the time (for example, one or more frames which may assign UL bandwidth to support the MS to send RNG-REQ message for the MS) which is determined by RS#2 through bandwidth distribution mechanism and may assign UL bandwidth for the MS, or the time comprehensively obtained by RS#2 based on the above two time points.

Step S1104: The serving MR-BS determines whether to recommend RS#2 to the MS as the potential target station according to the association information reported by RS#2 and other maintenance information.

Step S1105: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1106: The serving MR-BS sends the MOB_BSHO-REQ message to the MS, including the tag list of the potential target stations recommended to the MS by the serving MR-BS and related information.

Step S1107: The MS sends MOB_HO-IND message to the serving MR-BS, including the tag of the handover target station ascertained by the MS and related information.

The serving MR-BS indicates to RS#2 the related information, and RS#2 reports whether to recommend itself as the potential target station of the MS and feeds back the time for fast handover in the following ways: The serving MR-BS sends the handover information request to RS#2, including the MS tag, the service information between the MS and the serving MR-BS, and/or the service information between the MS and RS#2. RS#2 responds to the handover information, including the MS tag, a tag (suggest/not suggest) which suggests to or not to recommend RS#2 as the potential target station of the MS; if the tag is "suggest", the message may also include the time of supporting the fast MS handover.

Figure 12:
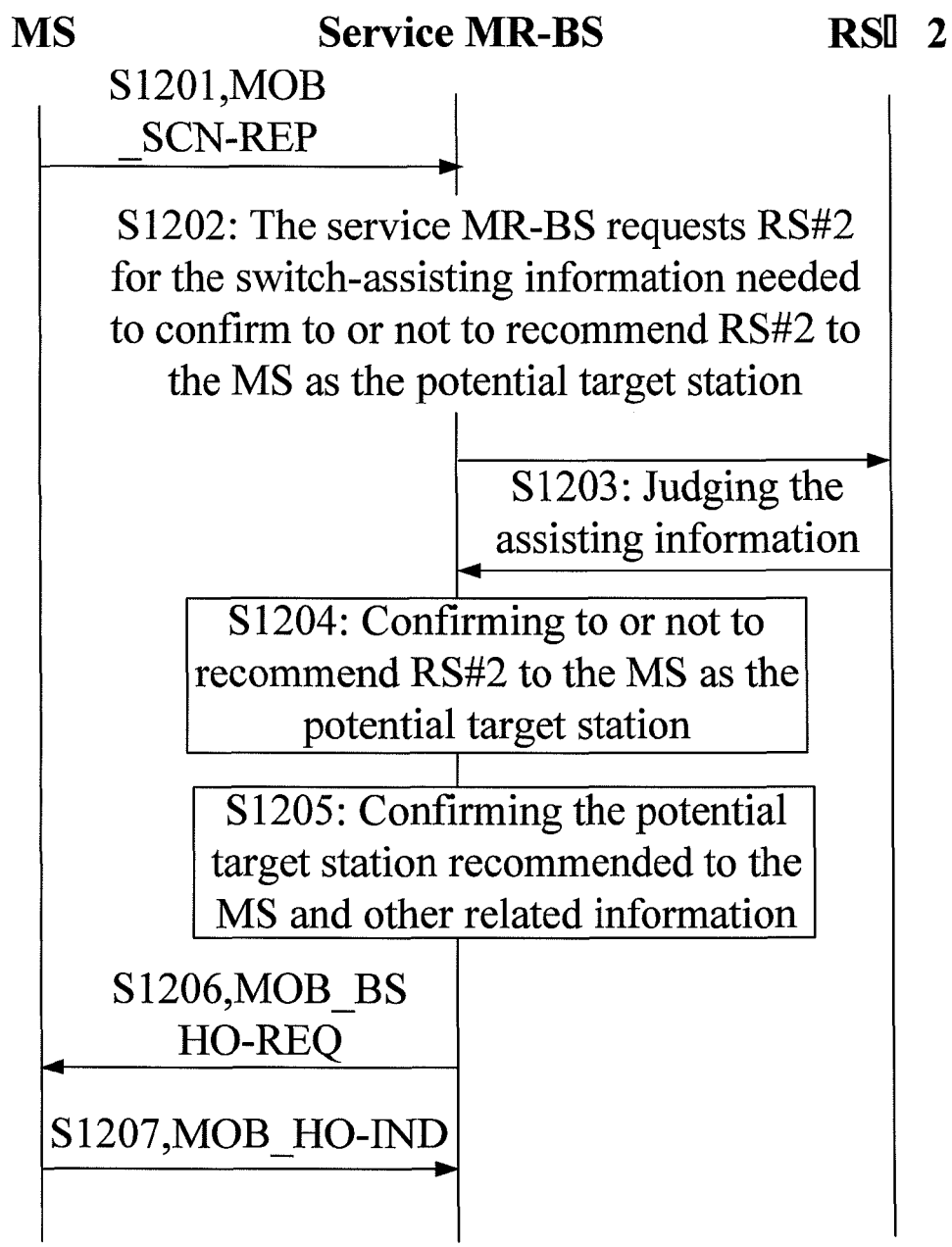
FIG. 12 shows a flowchart of a handover process triggered by the serving MR-BS while the neighbor station of the MS includes RS#2 in embodiment 5 of the present invention.

FIG. 12 shows a flowchart of a handover process triggered by the serving MR-BS while the neighbor station of the MS includes RS#2 in embodiment 5 of the present invention. In the process of implementing this embodiment, if the MS does not correlate in RS#2 or does not succeed in association, the serving MR-BS needs to request RS#2 to report the handover-assisting information, including the following steps.

Step S1201: The MS sends the MOB-SCN_REP message to the serving MR-BS, including DL RSSI of RS#3 detected by the MS and other scanned information.

Step S1202: After triggering MS handover judgment, the serving MR-BS requests RS#2 for the handover-assisting information needed for determining whether to recommend RS#2 to the MS as the potential target station.

Step S1203: RS#2 returns the handover-assisting information to the serving MR-BS, including the service information (for example, CINR statistics, BER PHY service quality information) for subsidiary MSs and/or RSs, available downlink wireless resources, available uplink wireless resources, and/or interference measure result.

Step S1204: The serving MR-BS determines whether to recommend RS#2 to the MS as the potential target station according to the handover-assisting information from RS#2.

Step S1205: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1206: The serving MR-BS sends MOB_BSHO-REQ message to the MS, including the tag list of the potential target stations recommended to the MS by the serving MR-BS and related information.

Step S1207: The MS sends MOB_HO-IND message to the serving MR-BS, including the tag of the handover target station and related information ascertained by the MS.

Figure 13:
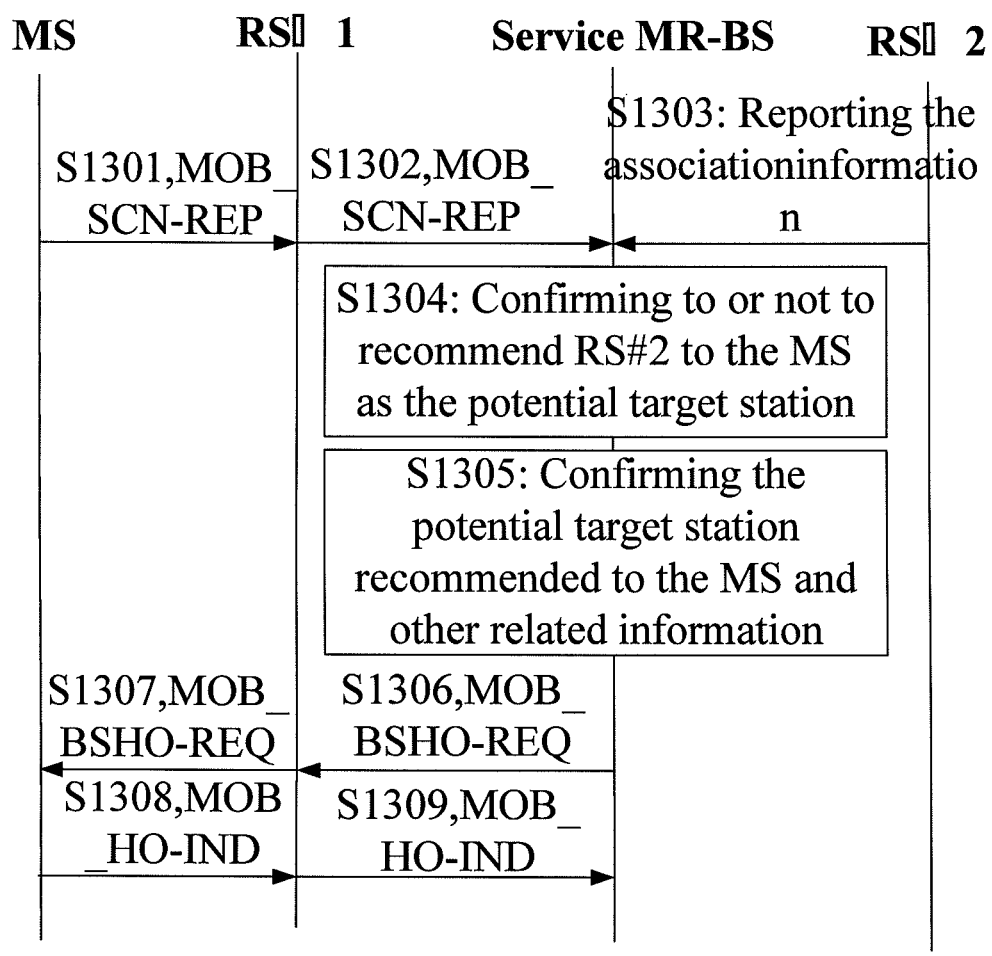
FIG. 13 shows a flowchart of a handover process triggered by the serving MR-BS while the neighbor station of the MS includes RS#2 in embodiment 6 of the present invention.

FIG. 13 shows a flowchart of a handover process triggered by the serving MR-BS, while the neighbor station of the MS includes RS#2 in embodiment 6 of the present invention. In the process of implementing this embodiment, the serving station of the MS is RS#1 and the serving MR-BS of the MS is also the serving MR-BS of RS#1. RS#2 reports the MS's association information to the serving MR-BS during or after the association by the MS. The report is triggered on condition that RS #2 determines whether to receive the initial ranging code of the MS, or receive the RNG-REQ message carried with MS MAC address from the MS, or judge the satisfied channel quality information (for example, UL CINR of the MS is greater than a given threshold) between the MSs after receiving the RNG-REQ message carried with MS MAC address from the MS. It should be noted that there is no time sequence between the process of reporting the MS's association information to the serving MR-BS unsolicitedly by RS#2 and the process of sending MOB_SCN-REP message to the serving MR-BS by the MS, where the association information includes: UL PHY quality information of the MS obtained by the RS (for example, UL CINR average and UL RSSI average), and/or effective time range of the channel parameters obtained by the MS during association and estimation by RS#2. Optionally, if a given condition meets the triggering requirement, for example, the serving MR-BS judges that the DL link quality reported by the MS through a scanning report meets a given condition (for example, DL CINR average value is lower than a given threshold), the serving MR-BS instructs RS#1 to report channel quality information between RS#1 and the MS detected by RS#1, for example, UL PHY quality information (for example, CINR average and RSSI average) of the MS detected by RS#1. The embodiment includes the following steps:

Step S1301: The MS sends the MOB-SCN_REP message to RS#1, including DL RSSI of RS#3 detected by the MS and other scanned information.

Step S1302: RS#1 forwards the sent MOB_SCN-REP message to the serving MR-BS.

Step 1303: RS#2 reports the association information to the serving MR-BS. There is no time sequence between step S1302 and step S1303, and they can be executed simultaneously.

Step S1304: Under a given qualified triggering condition, the serving MR-BS determines whether to recommend RS#2 to the MS as the potential target station according to the association information reported by RS#2 and other maintenance information, the service information (for example, RTD, DL PHY quality information and UL PHY quality information between the MS and RS#1, where UL PHY quality information can be detected by RS#1 and reported to the serving MR-BS) between the MS and RS#1, and other maintenance information.

Step S1305: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1306: The serving MR-BS sends MOB_BSHO-REQ message to RS#1, including the tag list of the potential target stations recommended to the MS by the serving MR-BS and related information.

Step S1307: RS#1 forwards the MOB_BSHO-REQ message to the MS.

Step S1308: The MS sends the MOB_HO-IND message to RS#1, including the tag of the handover target station ascertained by the MS and related information.

Step S1309: RS#1 sends the MOB_HO-IND message to the serving MR-BS.

RS#2 may report the association information to the serving MR-BS in the following two ways:

1. The association information is reported to the serving MR-BS through RNG-REQ and association information TLV (Type/Length/Value) in the RNG-REQ message is added to carry the association information.

2. RS#2 sends the association report to the serving MR-BS, including the MS tag (for example, MS MAC address) and association-related information.

In step S1002 in the foregoing embodiments, other maintenance information based on which the serving MR-BS determines whether to recommend RS#2 to the MS as the potential target station can be the interference measure result. The information is derived as follows: If necessary (for example, when receiving the association information reported by RS#2, or when assigning a basic CID and primary managing CID for the MS), the serving MR-BS may instruct the RS to report the interference measure result (or instruct RS#2 to conduct an interference measure and report the result). The specific examples that the serving MR-BS instructs RS#2 to conduct an interference measure and report the result are as follows: The MR-BS starts an interference measuring mechanism and instructs the RS to test the interference and report the result through RS_NBR-MEAS-REP.

The method of serving the RS by the neighboring MR-BS is quite similar to that of serving the RS by the serving MR-BS, but the difference consists in the added handover information negotiation between the serving MR-BS and the neighboring MR-BS through the backbone network. Detailed below is the handover process from the MS to RS#3 of the neighboring MR-BS.

Figure 14:
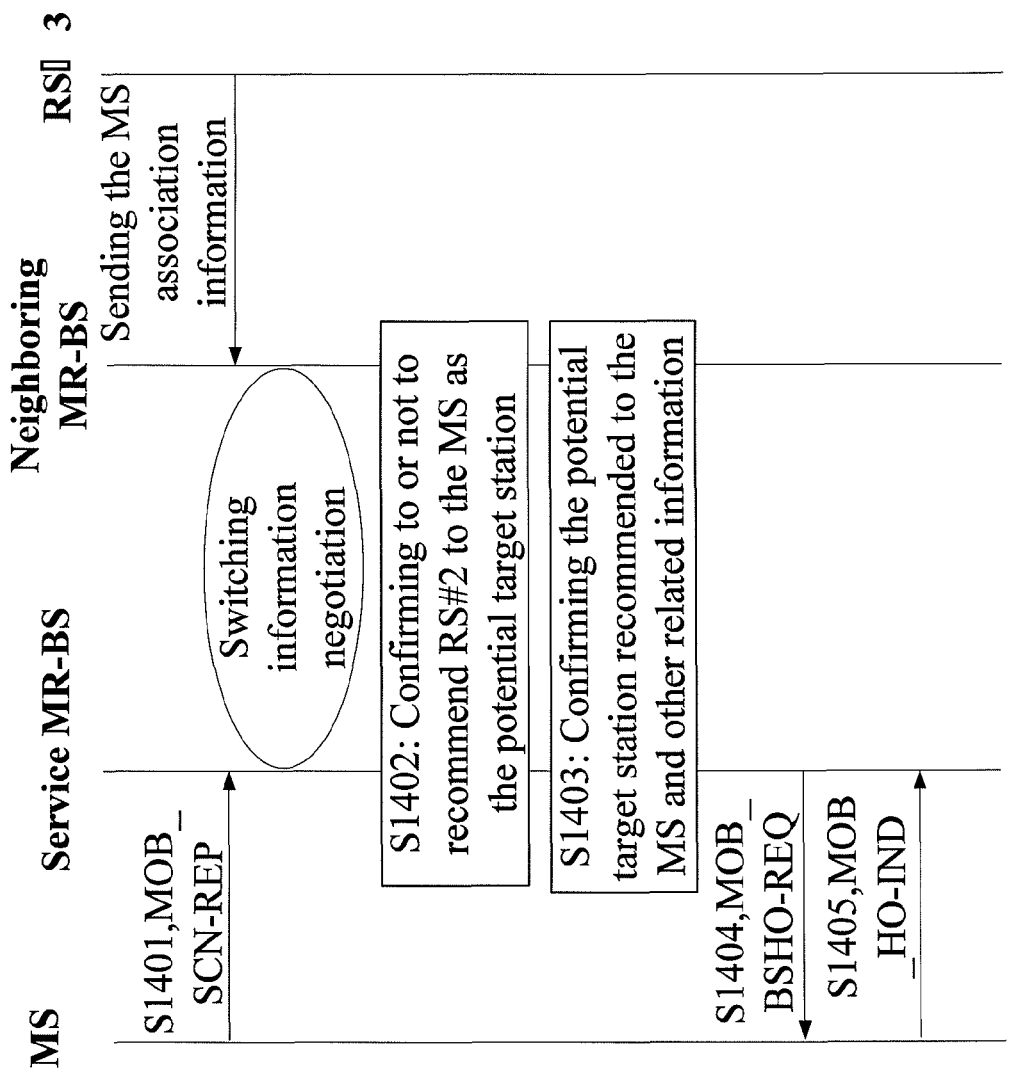
FIG. 14 shows a flowchart of a handover process triggered by the serving MR-BS while the neighbor station of the MS includes RS#3 in embodiment 7 of the present invention.

FIG. 14 shows a flowchart of a handover process triggered by the serving MR-BS while the neighbor station of the MS includes RS#3 in embodiment 7 of the present invention. In the process of implementing this embodiment, RS#3 reports the MS's association in formation to the neighboring MR-BS during or after the MS association. The report is triggered on the condition that the RS determines whether to receive the initial ranging code of the MS, or receive the RNG-REQ message carried with MS MAC address from the MS, or judge the satisfied channel quality information (for example, UL CINR of the MS is greater than a given threshold) between the MSs after receiving the RNG-REQ message carried with the MS MAC address from the MS. It should be noted that there is no time sequence between the process of reporting the MS's association information to the serving MR-BS unsolicitedly by RS#3 and the process of sending MOB_SCN-REP message to the serving MR-BS by the MS, where the association information includes: UL PHY quality information of the MS obtained by the RS (for example, UL CINR average and UL RSSI average), and/or effective time range of the channel parameters obtained by the MS during association and estimation by RS#2. The embodiment includes the following:

Step S1401: The MS sends MOB-SCN_REP message to the serving MR-BS, including DL RSSI of RS#3 detected by the MS and other scanned information.

Step S1402: After triggering MS handover judgment, the serving MR-BS negotiates handover information with the neighboring MR-BS through the backbone network and determines whether to recommend RS#3 to the MS as the potential target station. Herein, based on the MS's association information from RS#3, switch-related information from the serving MR-BS, and other maintenance information, the neighboring MR-BS may judge whether RS#3 is suitable for serving as the handover target station to the MS and send the result of judgment to the serving MR-BS; the neighboring MR-BS may also send the MS's association information from RS#3 and information about RS#3 to the serving MR-BS.

Step S1403: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1404: The serving MR-BS sends the MOB_BSHO-REQ message to the MS, including the tag list of the potential target stations recommended to the MS by the serving MR-BS and related information.

Step S1405: The MS sends the MOB_HO-IND message to the serving MR-BS, including the tag of the handover target station and related information ascertained by the MS.

RS#3 may report the association information to the neighboring MR-BS in the following two ways:

1. MS's association information is reported to the neighboring MR-BS through the RNG-REQ message and the TLV is added into the RNG-REQ message, to carry the association information.

2. RS#3 sends the association report to the neighboring MR-BS, including the MS tag (for example, MS MAC address) and association-related information.

Optionally, if necessary (for example, when receiving the association information reported by RS#2, or when assigning a basic CID and primary managing CID for the MS), the neighboring MR-BS may instruct the RS to report the interference measure result (or instruct RS#2 to conduct an interference measure and report the result). The specific example that the serving MR-BS instructs RS#3 to conduct an interference measure and report the result is as follows: The MR-BS starts an interference measuring mechanism and instructs the RS to test the interference and report the result through RS_NBR-MEAS-REP.

Figure 15:
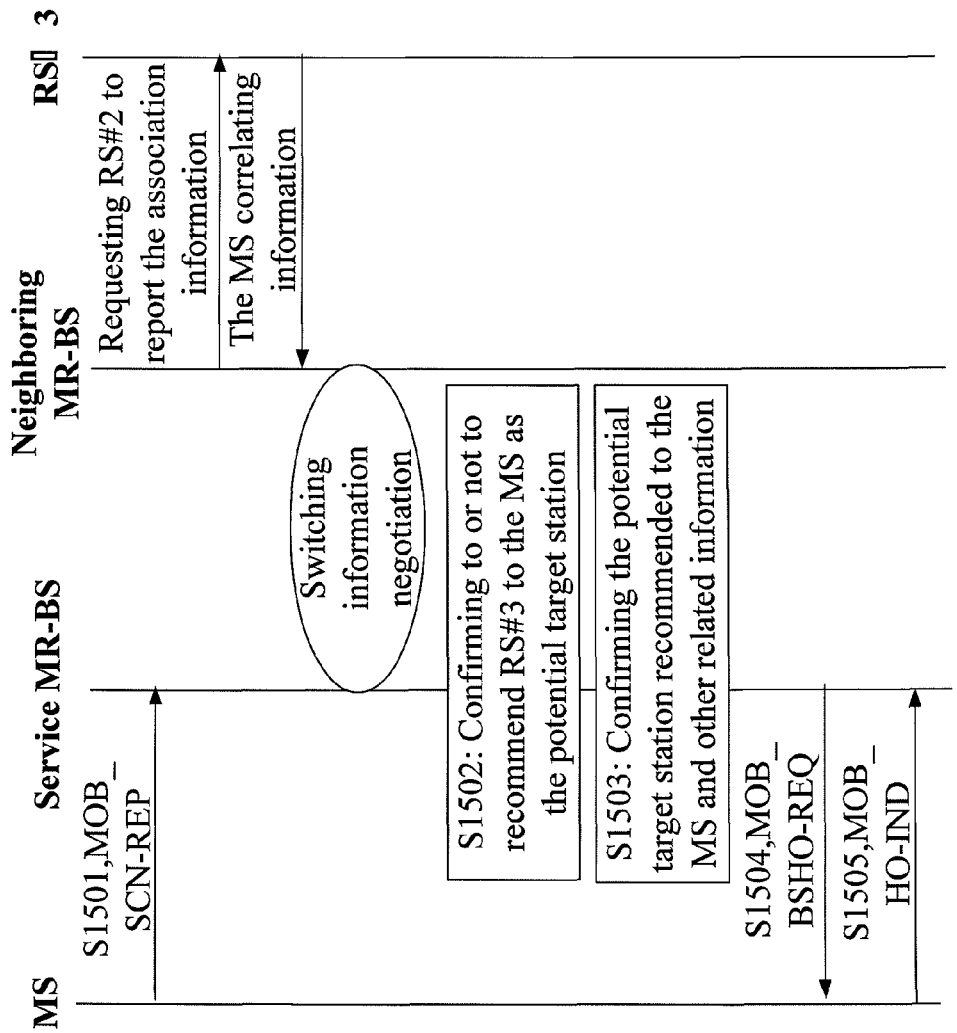
FIG. 15 shows a flowchart of a handover process triggered by the serving MR-BS while the neighbor station of the MS includes RS#3 in embodiment 8 of the present invention.

FIG. 15 shows a flowchart of a handover process triggered by the serving MR-BS while the neighbor station of the MS includes RS#3 in embodiment 8 of the present invention. In the process of implementing this embodiment, during or after the association between the RS and the MS, the neighboring MR-BS requests RS#3 for the MS's association information, and RS#3 responds to the MS's association information after receiving the request from the neighboring MR-BS. The triggering condition to trigger the neighboring MR-BS to request RS#3 for the MS's association information may be that the serving MR-BS has received the indication of successful MS ranging sent by RS#3, or has received the RNG-REQ message carried with MS MAC address forwarded by RS#3, or has ascertained the basic CID and primary managing CID assigned by RS#3. In this embodiment, there is no time sequence between the process of requesting RS#3 for the MS's association information by the neighboring MR-BS and the process of sending MOB_SCN-REP message to the serving MR-BS by the MS. The embodiment includes the following:

Step S1501: The MS sends MOB-SCN_REP message to the serving MR-BS, including DL RSSI of RS#3 detected by the MS and other scanned information.

Step S1502: After triggering MS handover judgment, the serving MR-BS negotiates handover information with the neighboring MR-BS through the backbone network, and determines whether to recommend RS#3 to the MS as the potential target station. Herein, based on the MS's association information from RS#3, switch-related information from the serving MR-BS, and other maintenance information, the neighboring MR-BS may judge whether RS#3 is suitable for serving as the handover target station to the MS and send the result of judgment to the serving MR-BS; the neighboring MR-BS may also send the MS's association information from RS#3 and information about RS#3 to the serving MR-BS.

Step S1503: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1504: The serving MR-BS sends the MOB_BSHO-REQ message to the MS, including the tag list of the potential target stations recommended to the MS by the serving MR-BS and related information.

Step S1505: The MS sends the MOB_HO-IND message to the serving MR-BS, including the tag of the handover target station and related information ascertained by the MS.

The neighboring MR-BS requests RS#3 to report the MS's association information, and RS#3 responds to the MS's association information in the following two ways:

1. The neighboring MR-BS sends the RNG-RSP message to RS#3 to indicate the assignment of the basic CID for the MS. Once RS#3 receives the indication, the request from the neighboring MR-BS for the MS's association information is successfully handled. RS#3 sends the association report to the neighboring MR-BS, including the MS tag and association-related information.

2. The neighboring MR-BS sends the RNG-RSP message to RS#3 to indicate the assignment of the basic CID for the MS. A TLV is added in the message. 1 means that a request is received, while 0 means that no request is received. Once receiving the request, RS#3 sends the association report to the neighboring MR-BS, including the MS tag and association-related information.

Optionally, the neighboring MR-BS may also instruct the RS to report the interference measure result (or instruct RS#3 to perform an interference measure and report the result) at the same time when requesting RS#3 to report the MS's association information. The specific examples that the neighboring MR-BS instructs RS#3 to conduct an interference measure and report the result are as follows: The MR-BS starts an interference measuring mechanism and instructs the RS to test the interference and report the result through RS_NBR-MEAS-REP.

Figure 16:
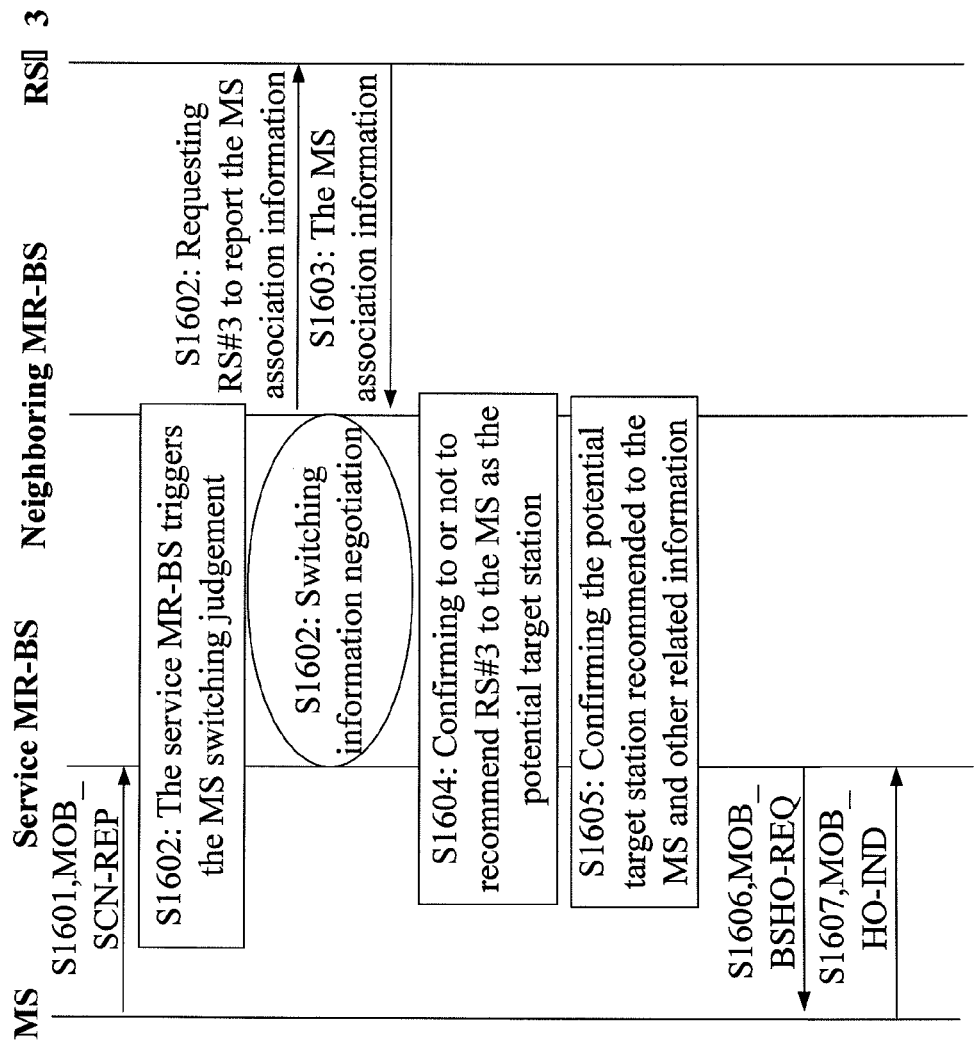
FIG. 16 shows a flowchart of a handover process triggered by the serving MR-BS while the neighbor station of the MS includes RS#3 in embodiment 9 of the present invention.

FIG. 16 shows a flowchart of a handover process triggered by the serving MR-BS while the neighbor station of the MS includes RS#3 in embodiment 9 of the present invention. In the process of implementing this embodiment, the MS succeeds in performing the association on RS#3.

Step S1601: The MS sends MOB-SCN_REP message to the serving MR-BS, including DL RSSI of RS#3 detected by the MS and other scanned information.

Step S1602: After triggering MS handover judgment, the serving MR-BS negotiates handover information with the neighboring MR-BS through the backbone network, and at the same time, the neighboring MR-BS requests RS#3 for MS's association information.

Step S1603: While performing handover information negotiation, RS#3 responds to the MS's association information after receiving the request from the neighboring MR-BS.

Step S1604: The serving MR-BS determines whether to recommend RS#3 to the MS as the potential target station based on the RS#3 related information and other maintenance information obtained from the neighboring MR-BS through the backbone network.

Step S1605: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1606: The serving MR-BS sends the MOB_BSHO-REQ message to the MS, including the tag list of the potential target stations recommended to the MS by the serving MR-BS and related information.

Step S1607: The MS sends the MOB_HO-IND message to the serving MR-BS, including the tag of the handover target station and related information ascertained by the MS.

Optionally, in step S1603, in addition to the MS's association information, the neighboring MR-BS requests RS#3 to report the service information (for example, CINR statistics, BER PHY service quality information, available downlink wireless resources, available uplink wireless resources) for subsidiary MSs and/or RSs, and/or the interference measure result.

The neighboring MR-BS requests RS#3 for the MS's association information and other optional information, and RS#3 responds to that in the following ways: The neighboring MR-BS sends the handover information request to RS#3, including the MS tag; RS#3 responds to the handover response, including the MS tag, association-related information as well as the service information of subsidiary MSs and/or RSs and/or interference measure result.

Figure 17:
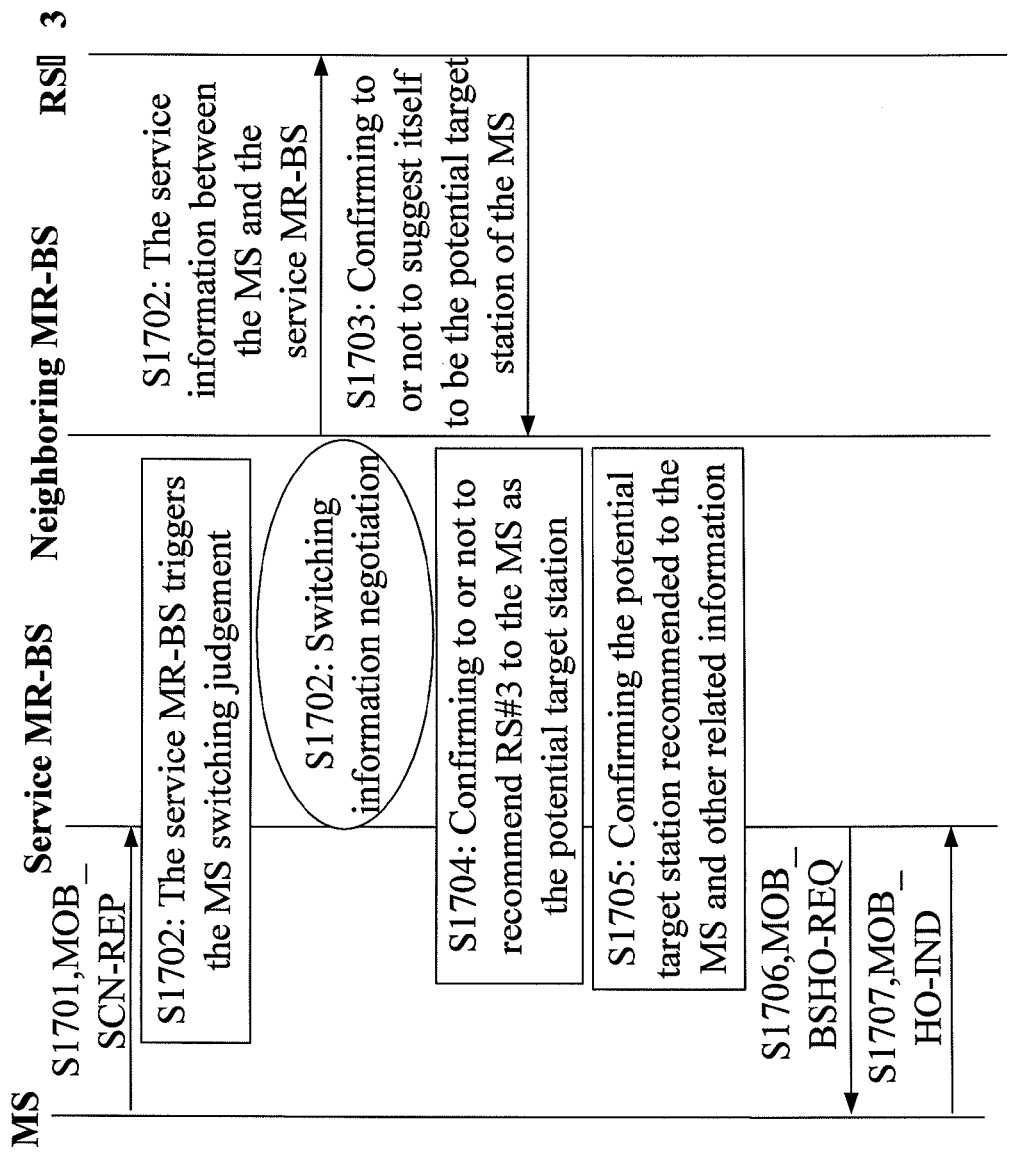
FIG. 17 shows a flowchart of a handover process triggered by the serving MR-BS while the neighbor station of the MS includes RS#3 in embodiment 10 of the present invention.

FIG. 17 shows a flowchart of a handover process triggered by the serving MR-BS while the neighbor station of the MS includes RS#3 in embodiment 10 of the present invention. In the process of implementing this embodiment, the MS succeeds in performing the association on RS#3.

Step S1701: The MS sends MOB-SCN_REP message to the serving MR-BS, including DL RSSI of RS#3 detected by the MS and other scanned information.

Step S1702: After triggering MS handover judgment, the serving MR-BS negotiates handover information with the neighboring MR-BS through the backbone network, and at the same time the neighboring MR-BS indicates to RS#3 the service information (for example, RTD, DL PHY quality information and UL PHY quality information between the MS and the serving MR-BS) between the MS and the serving MR-BS, and/or the service information (for example, DL PHY quality information and UL PHY quality information between the MS and RS#3, and the effective time range of the channel parameters obtained by the MS during association and estimated by RS#3) between the MS and RS#3.

Step S1703: While performing the handover information negotiation, according to the information indicated by the neighboring MR-BS and other maintenance information, RS#3 determines whether to recommend itself as the potential target station of the MS and feeds back the determined result to the neighboring MR-BS. Optionally, if RS#3 feeds back the suggestion, RS#3 may feed back the time for supporting a fast MS handover to the neighboring MR-BS; if RS#3 is performing in an RS of centralized dispatching, the time can be the effective time (one or more frames) of the channel parameters obtained by the MS during association and estimation by RS#3; if RS#3 is performing in an RS of distributed dispatching, the time can be the effective time (one or more frames) of the channel parameters obtained by the MS during association and estimation by RS#3, and/or the time (for example, one or more frames which may assign UL bandwidth to support the MS to send RNG-REQ message for the MS) which is determined by RS#3 through bandwidth distribution mechanism and may assign the UL bandwidth for the MS, or the time comprehensively obtained by RS#3 based on the above two time points.

Step S1704: The serving MR-BS determines whether to recommend RS#3 to the MS as the potential target station according to the handover information negotiation result with the neighboring MR-BS through the backbone network and other maintenance information.

Step S1705: The serving MR-BS ascertains all the potential target stations recommended to the MS and related information. Herein, all potential target stations recommended to the MS and ascertained by the serving MR-BS may include the RS in the serving MR cell, the neighboring MR-BS, and the RS in the neighboring MR cell.

Step S1706: The serving MR-BS sends MOB_BSHO-REQ message to the MS, including the tag list of the potential target stations recommended to the MS by the serving MR-BS and related information.

Step S1707: The MS sends MOB_HO-IND message to the serving MR-BS, including the tag of the handover target station and related information ascertained by the MS.

The neighboring MR-BS indicates the related information to RS#3 and RS#3 feeds back whether to recommend itself as the potential target station of the MS and feeds back the time for fast handover in the following ways: The neighboring MR-BS sends the handover information request to RS#3, including the MS tag, the service information between the MS and the serving MR-BS, and/or the service information between the MS and RS#3; RS#3 responds to the handover information response, including the MS tag, a tag (suggest/not suggest) which suggests to or not to recommend RS#3 as the potential target station of the MS; if the tag is "suggest", the message may also include the time supporting the fast MS handover.

Figure 18:
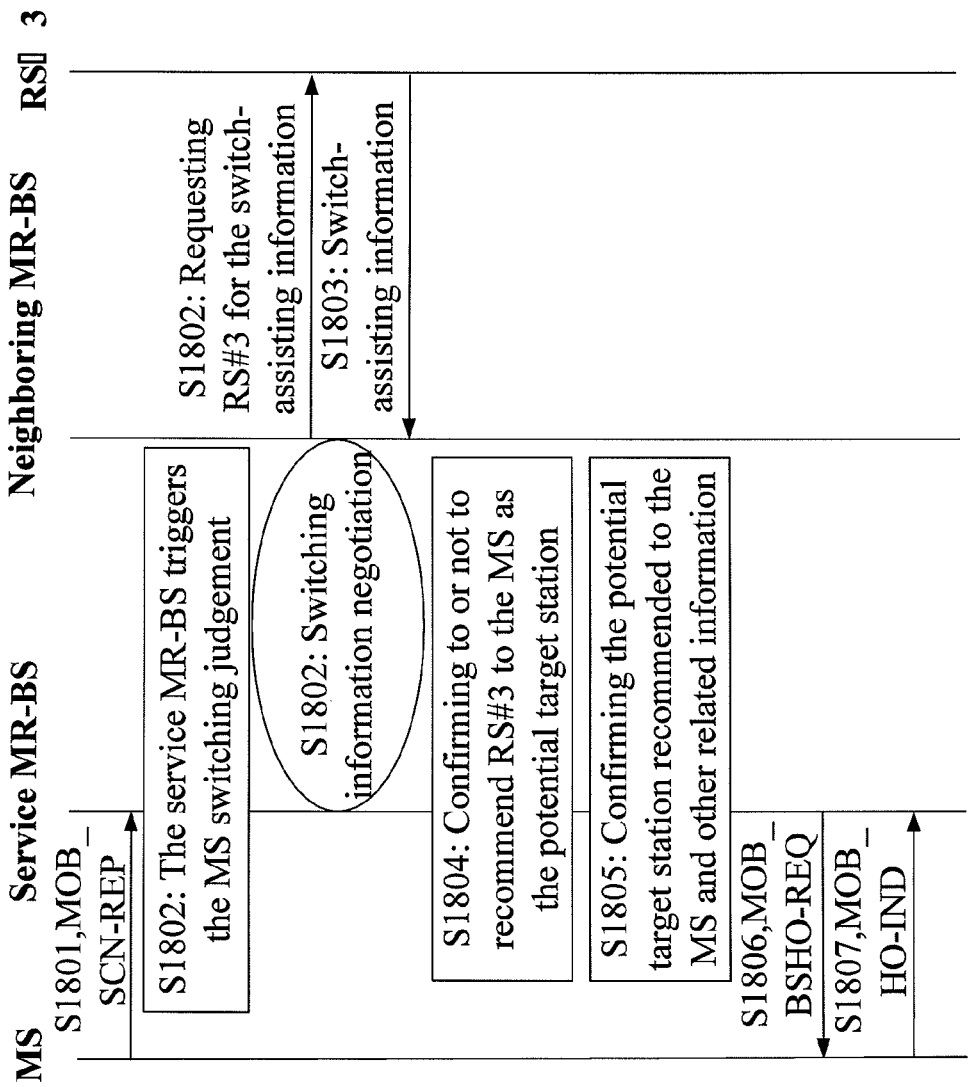
FIG. 18 shows a flowchart of a handover process triggered by the serving MR-BS while the neighbor station of the MS includes RS#3 in embodiment 10 of the present invention.

FIG. 18 shows a flowchart of a handover process triggered by the serving MR-BS while the neighbor station of the MS includes RS#3 in embodiment 10 of the present invention. In the process of implementing this embodiment, the MS succeeds in performing the association on RS#3.

Step S1801: The MS sends MOB-SCN_REP message to the serving MR-BS, including DL RSSI of RS#3 detected by the MS and other scanned information.

Step S1802: After triggering MS handover judgment, the serving MR-BS negotiates handover information with the neighboring MR-BS through the backbone network. Meanwhile, the neighboring MR-BS requests RS#3 for the handover-assisting information needed for the neighboring MR-BS to determine whether to suggest the serving MR-BS to recommend RS#3 to the MS as the potential target station; or the neighboring MR-BS requests RS#3 for the handover-assisting information needed to assist the serving MR-BS to finally determine whether to recommend RS#3 to the MS as the potential target station.

Step S1803: While performing the handover information negotiation, RS#3 feeds back the handover-assisting information to the neighboring MR-BS, including the service information (for example, CINR statistics, BER PHY service quality information and available downlink wireless resources, and available uplink wireless resources) for subsidiary MSs and/or RSs, and/or interference measure result.

Step S1804: The serving MR-BS determines whether to recommend RS#3 to the MS as the potential target station based on the RS#3 related information and other maintenance information obtained from the neighboring MR-BS through the backbone network.

Step S1805: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1806: The serving MR-BS sends MOB_BSHO-REQ message to the MS, including the tag list of the potential target stations recommended to the MS by the serving MR-BS and related information.

Step S1807: The MS sends MOB_HO-IND message to the serving MR-BS, including the tag of the handover target station and related information ascertained by the MS.

Figure 19:
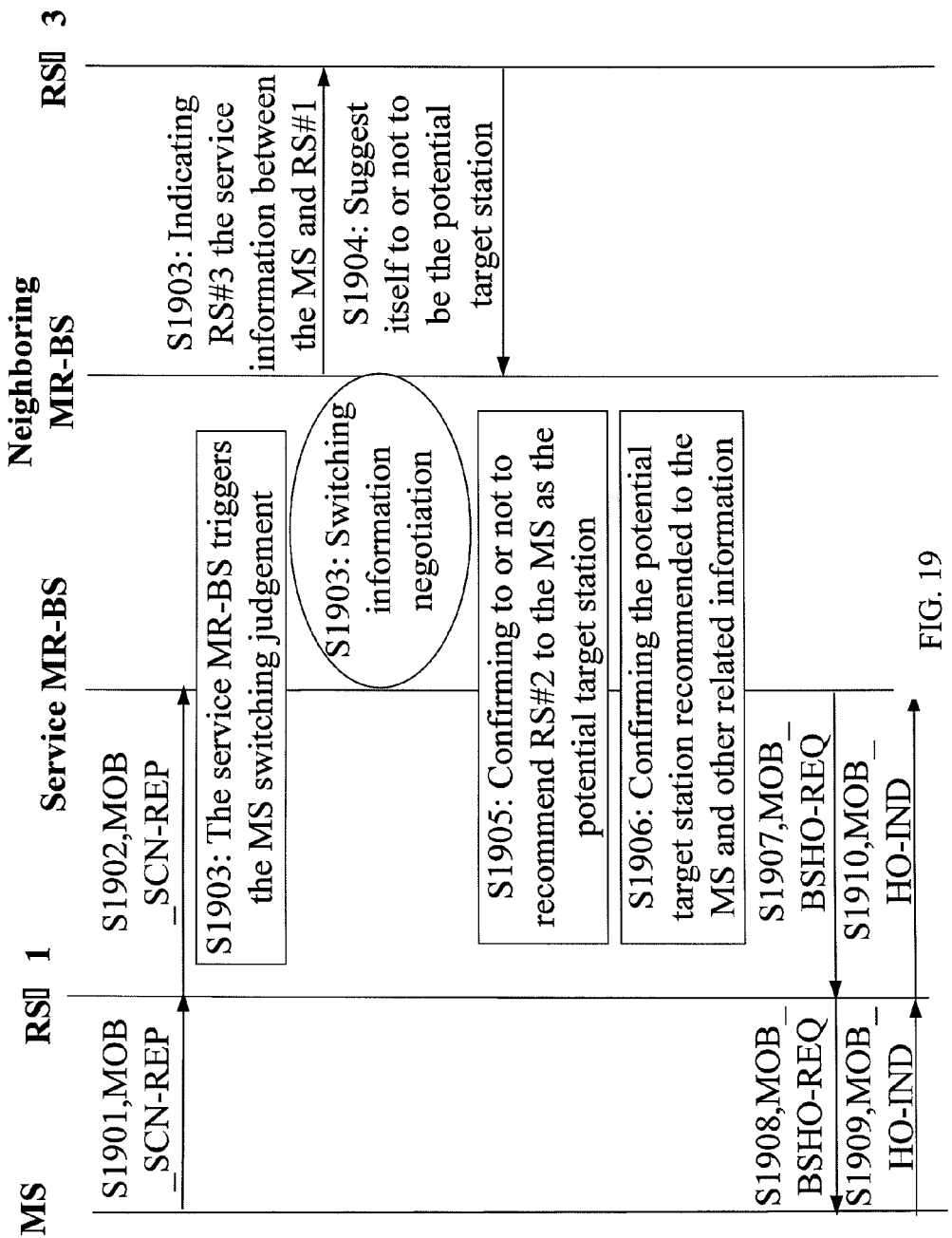
FIG. 19 shows a flowchart of a handover process triggered by the serving MR-BS while the neighbor station of the MS includes RS#3 in embodiment 11 of the present invention.

FIG. 19 shows a flowchart of a handover process triggered by the serving MR-BS while the neighbor station of the MS includes RS#3 in embodiment 11 of the present invention. In the process of implementing this embodiment, the serving station of the MS is RS#1 and the serving MR-BS of the MS is also the serving MR-BS of RS#1, and the MS does not perform or does not succeed in performing the association on RS#3.

Step S1901: The MS sends the MOB-SCN_REP message to RS#1, including DL RSSI of RS#3 detected by the MS and other scanned information.

Step S1902: RS#1 forwards the sent MOB_SCN-REP message to the serving MR-BS.

Step S1903: After triggering MS handover judgment, the serving MR-BS negotiates handover information with the neighboring MR-BS through the backbone network. Meanwhile, the neighboring MR-BS indicates to RS#3 the service information (for example, RTD, DL PHY quality information, and UL PHY quality information between the MS and RS#1) between the MS and RS#1, and/or the service information (for example, DL PHY quality information and UL PHY quality information between the MS and RS#3) between the MS and RS#3. Optionally, before or after triggering MS handover judgment, the serving MR-BS may instruct RS#1 to report the channel quality information detected by RS#1 between RS#1 and the MS, for example, UL PHY quality information (for example, UL CINR average and UL RSSI average) of the MS detected by RS#1. Then, the serving MR-BS may send the channel quality information detected and reported by RS#1 between RS#1 and the MS through the backbone network to the neighboring MR-BS.

Step S1904: While performing the handover information negotiation, RS#3 determines whether to recommend itself as the potential target station of the MS according to the information indicated by the neighboring MR-BS and other maintenance information, and feeds back the determined result to the neighboring MR-BS.

Step S1905: The serving MR-BS determines whether to recommend RS#3 to the MS as the potential target station based on the RS#3 related information and other maintenance information obtained and received from the neighboring MR-BS through the backbone network.

Step S1906: The serving MR-BS ascertains all the potential target stations recommended to MS and related information. Herein, all potential target stations recommended to the MS and ascertained by the serving MR-BS may include the RS in the serving MR cell, the neighboring MR-BS, and the RS in the neighboring MR cell.

Step S1907: The serving MR-BS sends MOB_BSHO-REQ message to RS#1, including the tag list of the potential target stations recommended to the MS by the serving MR-BS and related information.

Step S1908: RS#1 forwards the MOB_BSHO-REQ message to the MS.

Step S1909: The MS sends the MOB_HO-IND message to RS#1, including the tag of the handover target station and related information ascertained by the MS.

Step S1910: RS#1 sends the MOB_HO-IND message to the serving MR-BS.

The neighboring MR-BS indicates the related information to RS#3, and RS#3 reports whether to recommend itself as the potential target station of the MS in the following ways: The neighboring MR-BS sends the handover information request to RS#3, including the MS tag, the service information between the MS and RS#1, and/or the service information between the MS and RS#3; RS#4 responds to the handover information response, including the MS tag, a tag (suggest/not suggest) which suggests to or not to recommend RS#4 as the potential target station of the MS.

It should be noted that the foregoing embodiments are described by taking the handover process triggered by the serving MR-BS as examples. The handover process triggered by the MS is basically the same as the handover process triggered by the serving MR-BS in foregoing embodiments, but the difference lies in that: When the serving station of the MS is the serving MR-BS, the description of "after triggering MS handover judgment by the serving MR-BS" is replaced by the description of "after triggering MS handover judgment by the MS, sending the MOB_MSHO-REQ message to the serving MR-BS and receiving the MOB_MSHO-REQ message by the serving MR-BS" and the message of MOB_BSHO-REQ is replaced by MOB_BSHO-RSP; when the serving station of the MS is RS#1, the description of "after triggering MS handover judgment by the serving MR-BS" is replaced by the description of "after triggering MS handover judgment by the MS, sending the MOB_MSHO-REQ message to the RS#1, forwarding the MOB_MSHO-REQ message to the serving MR-BS by RS#1, and receiving the MOB_MSHO-REQ message by the serving MR-BS" and the message of MOB_BSHO-REQ is replaced by MOB_BSHO-RSP. Other processes and steps will not be discussed herein as they are the same as the handover process triggered by the serving MR-BS.

Figure 20:
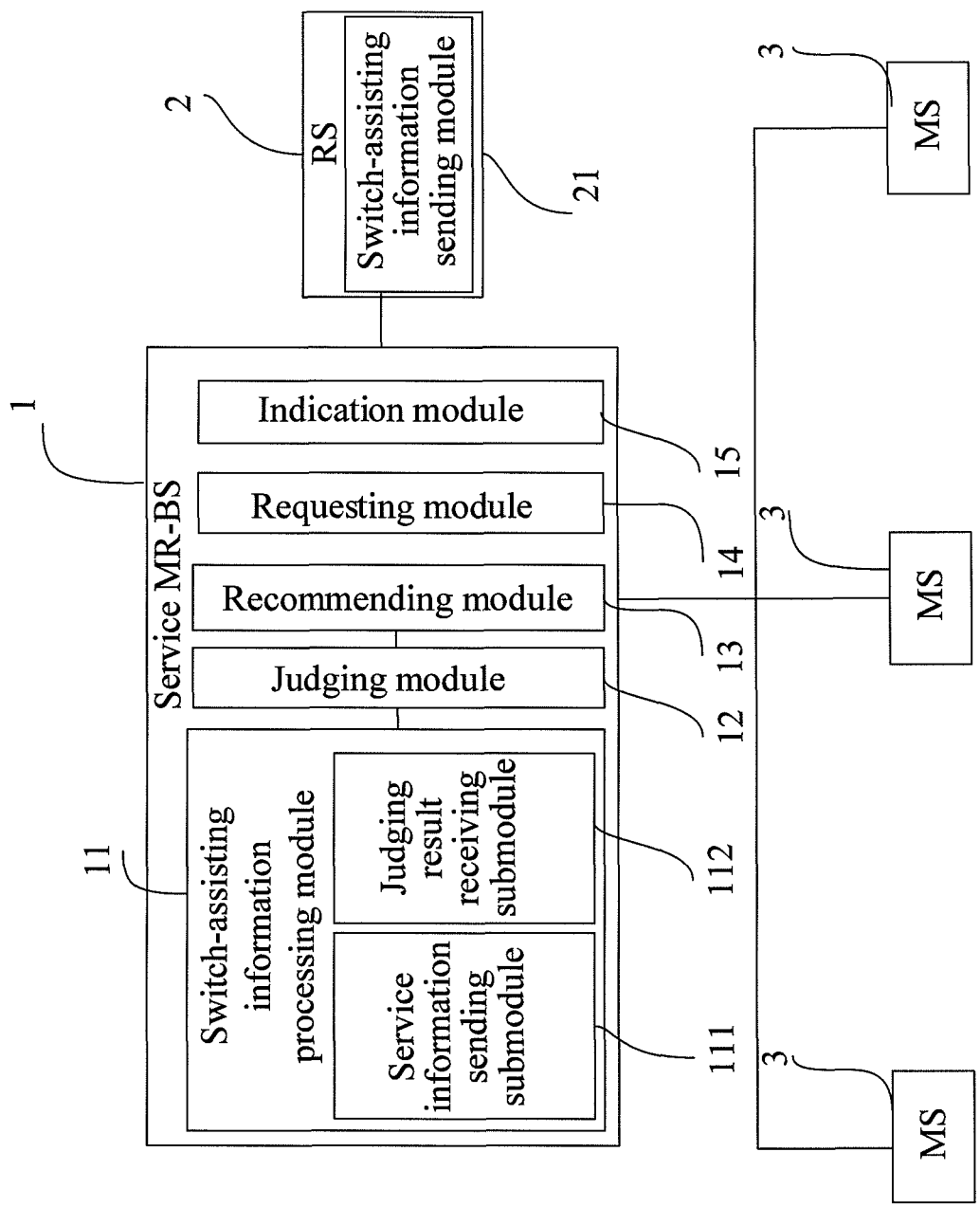
FIG. 20 is a schematic view showing a structure of a system for MS handover in embodiment 1 of the present invention.

FIG. 20 is a schematic view showing a structure of a system for MS handover in embodiment 1 of the present invention. The system performs handover inside a cell. The system includes RS2, the serving MR-BS1 of RS2, and at least one MS3. RS2 is configured to send handover-assisting information to serving MR-BS1. The serving MR-BS1 is configured to determine whether to recommend RS2 to MS3 as a target station according to the handover-assisting information, and determine to indicate the handover related information to MS3 according to the result of judgment.

The serving MR-BS1 includes a handover-assisting information processing module 11, a judging module 12, and a recommending module 13.

The handover-assisting information processing module 11 is configured to receive handover-assisting information from RS2.

The judging module 12 is configured to determine whether to recommend RS2 to MS3 as the target station according to handover-assisting information.

The recommending module 13 is configured to indicate the handover related information to MS3 according to the result of judgment.

The serving MR-BS1 further includes a requesting module 14, configured to request RS2 for handover-assisting information when or after the serving MR-BS1 performs association in RS2 and MS3.

The serving MR-BS1 further includes an instruction module 15, which is configured to instruct RS2 to conduct an interference measure for MS3 and instruct RS2 to report the interference measure result.

The handover-assisting information processing module 11 includes a service information sending submodule 111 and a result of judgment receiving submodule 112. The service information sending submodule 111 is configured to send the service information of MS3 and the current accessed RS, and/or the service information of MS3 and RS1 to RS2. The result of judgment receiving submodule 112 is configured to receive the result of judgment by RS2 about whether RS2 is suitable for being the target station of MS3 according to the service information from the service information sending submodule 111.

RS2 includes a handover-assisting information recommending module 21, which is configured to send the handover-assisting information to the serving MR-BS1.

Figure 21A:
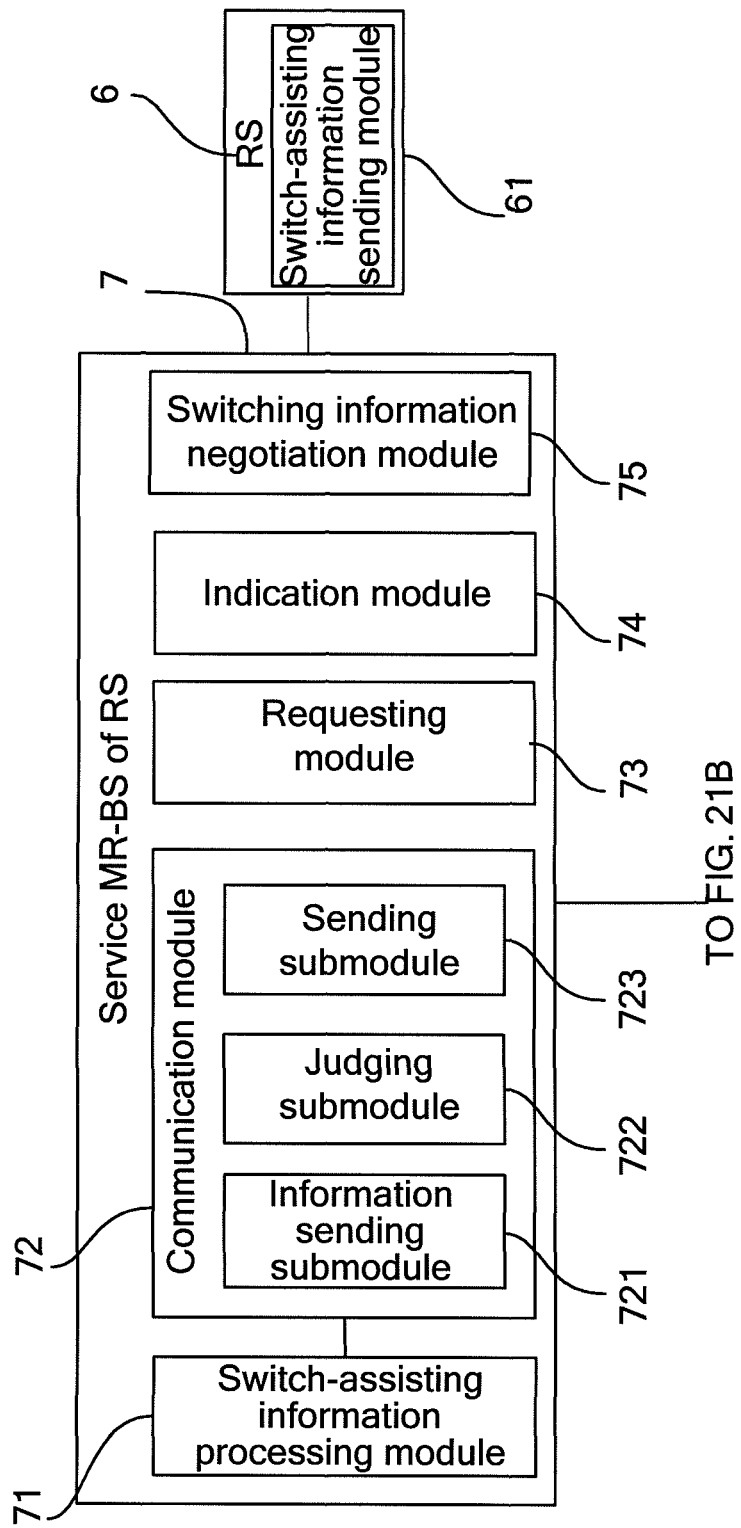
FIG. 21 is a schematic view showing a structure of a system for MS handover in embodiment 2 of the present invention.
Figures 21, 21B:
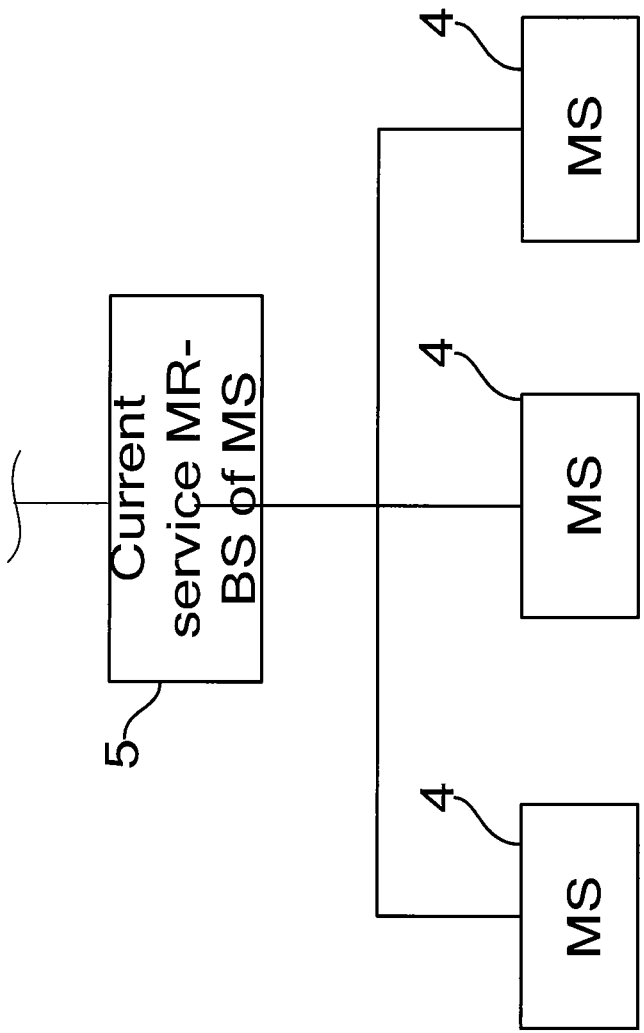

FIG. 21 is a schematic view showing a structure of a system for MS handover in embodiment 2 of the present invention. The system performs handover inside a cell. The system includes MS4, a current serving MR-BS5, RS6, and serving MR-BS7 of the RS. RS6 is configured to send the handover-assisting in formation to serving MR-BS7 of the RS. The serving MR-BS7 is configured to communicate with the current serving MR-BS5 of the MS through the backbone network and send the handover-assisting information received by the handover-assisting information processing module to the current serving MR-BS of the MS, or judge whether the RS is suitable for being the target station of the MS according to the handover-assisting information received by the handover-assisting information processing module and return the result of judgment to the current serving MR-BS of the MS. The current serving MR-BS5 of the MS is configured to determine whether to recommend RS6 to MS4 as the target station of MS4.

The serving MR-BS7 includes a handover-assisting information processing module 71 and a communication module 72.

The handover-assisting information processing module 71 is configured to receive the handover-assisting information from RS6.

The communication module 72 is configured to communicate with the current serving MR-BS5 of MS4 through the backbone network.

The communication module 72 includes:

an information sending submodule 721, configured to send the received handover-assisting information to the current serving MR-BS5 of the MS;

a judging submodule 722, configured to judge whether RS6 is suitable for being the target station of MS4 according to the handover-assisting information; and a sending submodule 723, configured to return the result of judgment by the judging submodule 722 to the current serving MR-BS5 of the MS.

The serving MR-BS7 further includes a requesting module 73, configured to request RS6 for handover-assisting information when or after performing association in RS6 and MS4.

The serving MR-BS7 further includes an instruction module 74, configured to instruct RS6 to conduct an interference measure for MS4 and instruct RS6 to report the interference measure result.

The serving MR-BS7 further includes a handover information negotiation module 75, configured to negotiate with the current serving MR-BS5 of the MS about handover information.

The RS6 includes a handover-assisting information recommending module 61, which is configured to send the handover-assisting information to the serving MR-BS7 of the RS.

The embodiments of the present invention enable the serving MR-BS of the MS to obtain related information from the RS, enable the serving MR-BS of the MS to ascertain the target stations to be recommended to the MS and the related information to recommend preferable potential target stations to the MS in MOB_BSHO-REQ/RSP, and arrange a more reasonable fast handover time when supporting fast MS handover, which helps improve the handover performance of the MS and reduce the failure rate.

On the basis of the foregoing embodiments, it is understandable to those skilled in the art that the invention may be performed through a combination of software and required common hardware, or only hardware but preferably software. Thus, all or technical parts of the program may be performed through software stored in a storage medium, including multiple instructions to instruct a computer device (PC, server, or network device) to perform the method in each embodiment of the present invention.

Detailed above are only some exemplary embodiments of the present invention. It should be noted that those skilled in the art can make various modifications and variations to the invention without departing from the spirit and scope of the invention. The invention is intended to cover the modifications and variations provided that they fall in the scope of protection.

What is claimed is:

1. A method for Mobile Station (MS) handover, the method comprising:

sending, by a serving Multi-hop Relay Base Station (MR-BS), service information of a MS and service information of a Relay Station (RS) to the RS;

receiving, by the serving MR-BS, handover-assisting information from the RS served by the serving MR-BS, wherein the handover-assisting information comprises association information of the MS, wherein the association information being Uplink Physical Layer (UL PHY) quality information of the MS, wherein the handover-assisting information further comprises a result of judgment by the RS about whether the RS is suitable for being a target station of the MS, and the result of the judgment about whether the RS is suitable for being the target station of the MS is made by the RS according to the service information of the MS and the service information of the RS sent by the serving MR-BS; and determining, by the serving MR-BS, whether to recommend the RS to the MS as a target station according to the handover-assisting information.

2. The method according to claim 1, wherein the handover-assisting information is unsolicitedly reported by the RS to the serving MR-BS during an association between the RS and the MS.

3. The method according to claim 1, wherein before the serving MR-BS receiving the handover-assisting information from the RS, the method comprising:

requesting, by the serving MR-BS, the handover-assisting information from the RS during an association between the RS and the MS.

4. The method according to claim 3, wherein the handover-assisting information further comprises service information of the MS from the RS, or an interference measure result.

5. The method according to claim 4, wherein before the serving MR-BS receiving, the handover-assisting information from the RS, the method comprising:

instructing the RS to report the interference measure result by the serving MR-BS after the RS reports an interference.

6. The method according to claim 1, wherein the step of receiving the handover-assisting information from the RS further comprising:

requesting, by the serving MR-BS, for the handover-assisting information from the RS after triggering a MS handover judgment; and responding the handover-assisting information to the serving MR-BS by the RS after receiving the request of the serving MR-BS.

7. The method according to claim 1, wherein when a serving station of the MS is the RS, the method further comprising:

instructing, by the serving MR-BS, the serving station to report channel quality information between the RS and the MS when a triggering requirement is met.

8. The method according to claim 7, wherein the triggering requirement comprising:

judging, by the serving MR-BS, that a DL link quality reported by the MS through a scanning report is lower than a preset threshold.

9. The method according to claim 1, wherein the serving MR-BS is a neighbor station of the MS, and the serving MR-BS is configured to communicate with a current serving MR-BS of the MS through a backbone network.

10. The method according to claim 9, wherein communicating with the current serving MR-BS of the MS through the backbone network further comprises:

reporting, by the serving MR-BS, the handover-assisting information to the current serving MR-BS of the MS; or reporting the result of judgment by the serving MR-BS about whether the RS is suitable for being the target station of the MS according to the service information.

11. A system for mobile station (MS) handover, comprising: a Relay Station (RS), a serving Multi-hop Relay Base Station (MR-BS) of the RS, and a MS, wherein:
the RS is configured to send handover-assisting information to the serving MR-BS serving the RS, wherein the handover-assisting information comprises association information of the MS, wherein the association information being Uplink Physical Layer (UL PHY) quality information of the MS; and
the serving MR-BS is configured to send service information of the MS and service information of the RS to the RS, and determine whether to recommend the RS to the MS as a target station according to the handover-assisting information;
wherein the handover-assisting information further comprises a result of judgment about whether the RS is suitable for being a target station of the MS, and wherein the result of judgment is made by the RS according to the service information of the MS and the service information of the RS sent by the serving MR-BS.

12. The system according to claim 11, further comprising: a current serving MR-BS of the MS, configured to communicate with the serving MR-BS of the MS through the backbone network.

13. A serving Multi-hop Relay Base Station (MR-BS) for mobile station (MS) handover, comprising a handover-assisting information processing module, a judging module, and a recommending module, wherein
the handover-assisting information processing module is configured to receive handover-assisting information from a Relay Station (RS) served by the serving MR-BS, wherein the handover-assisting information comprises association information of the MS, wherein the association information being Uplink Physical Layer (UL PHY) quality information of the MS;
the judging module is configured to determine whether to recommend the RS to the MS as a target station according to the handover-assisting information; and
the recommending module, configured to indicate handover related information to the MS according to a result of judgment of the judging module;
wherein the MR-BS is further configured to send service information of the MS and service information of the RS to the RS, and the handover-assisting information further comprises a result of judgment about whether the RS is suitable for being a target station of the MS, and wherein the result of judgment is made by the RS according to the service information of the MS and the service information of the RS sent by the serving MR-BS.

14. The serving MR-BS according to claim 13, further comprising: a requesting module, configured to request the RS for the handover-assisting information during an association between the RS and the MS.

15. The serving MR-BS according to claim 13, further comprising: an instruction module, configured to instruct the RS to conduct an interference measure for the MS and instruct the RS to report an interference measure result.

16. A serving Multi-hop Relay Base Station (MR-BS), comprising a handover-assisting information processing module and a communication module, wherein:
the handover-assisting information processing module is configured to receive handover-assisting information from a Relay Station (RS) served by the serving MR-BS, wherein the handover-assisting information comprises association information of a Mobile Station (MS), wherein the association information being Uplink Physical Layer (UL PHY) quality information of the MS; and
the communication module is configured to: communicate with a current serving MR-BS of the MS through a backbone network, send the handover-assisting information to the current serving MR-BS of the MS; or judge whether the RS is a target station of the MS according to the handover-assisting information, and return a result of judgment to the current serving MR-BS of the MS;
wherein the communication module further comprises a judging submodule and a sending submodule, wherein
the judging submodule is configured to judge whether the RS is suitable for being the target station of the MS according to the handover-assisting information; and
the sending submodule is configured to return the result of judgment by the judging submodule to the current serving MR-BS of the MS.

17. The serving MR-BS according to claim 16, wherein the communication module further comprises an information sending submodule configured to send the handover-assisting information to the current serving MR-BS of the MS.

18. The serving MR-BS according to claim 16, further comprising a requesting module, configured to request the RS for the handover-assisting information when performing an association between the RS and the MS.

19. The serving MR-BS according to claim 16, further comprising an instruction module, configured to instruct the RS to conduct an interference measure for the MS and instruct the RS to report an interference measure result.

20. The serving MR-BS according to claim 16, further comprising a handover information negotiation module, configured to negotiate with the current serving MR-BS of the MS about handover information.

* * * * *